US012631838B2

(12) United States Patent
Choudhury et al.

(10) Patent No.: US 12,631,838 B2
(45) Date of Patent: May 19, 2026

(54) ROTATING CIRCULAR WAVEGUIDE CHANNEL FOR FOLDABLE ELECTRONIC DEVICES

(71) Applicant: Intel Corporation, Santa Clara, CA (US)

(72) Inventors: Debabani Choudhury, Thousand Oaks, CA (US); Huimin Chen, Beaverton, OR (US); Eric Gantner, Portland, OR (US); Stephen Hall, Middleton, ID (US); Cooper Levy, Portland, OR (US); Shawn Mceuen, Portland, OR (US); Luis Paniagua Acuna, Alajuela (CR); Peter Sagazio, Portland, OR (US); Harry Skinner, Beaverton, OR (US); Kerry Stevens, Beaverton, OR (US); Ana Yepes, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 18/345,044

(22) Filed: Jun. 30, 2023

(65) Prior Publication Data

US 2025/0004222 A1 Jan. 2, 2025

(51) Int. Cl.
G02B 6/42 (2006.01)
G02B 6/44 (2006.01)

(52) U.S. Cl.
CPC .......... G02B 6/4279 (2013.01); G02B 6/423 (2013.01); G02B 6/424 (2013.01); G02B 6/4261 (2013.01); G02B 6/4478 (2013.01); G02B 6/4212 (2013.01)

(58) Field of Classification Search
None
See application file for complete search history.

(56) References Cited

U.S. PATENT DOCUMENTS 2,493,842 A * 1/1950 Tyrrell ..................... H01P 1/02
343/762
2,612,559 A * 9/1952 Jouguet .................... H01P 1/02
333/249
(Continued)

FOREIGN PATENT DOCUMENTS

CN 104409800 A 3/2015

OTHER PUBLICATIONS

Mar. 22, 2024—(PCT) International Search Report and Written Opinion—App PCT/US2023/077522.

*Primary Examiner* — Thomas A Hollweg
(74) *Attorney, Agent, or Firm* — Banner & Witcoff, Ltd.

(57) ABSTRACT

A rotatable circular waveguide structure is described that may comprise circular waveguide sections configured to propagate electromagnetic radiation. The circular waveguide sections may enable data signals to be transmitted between portions of an electronic device, such as a chassis and display portion, which may be rotatable with respect to one another. The rotatable circular waveguide structure may comprise one or more circular waveguide sections that are routed through a hinge of the electronic device, as well as one or more rotatable junctions. The rotatable junctions enable a rotation of circular waveguide sections with respect to one another as the coupled portions of the electronic device are also rotated. The rotatable circular waveguide structure may replace the use of data cables that are conventionally used to carry data signals between portions of an electronic device.

22 Claims, 24 Drawing Sheets

(56)                References Cited

U.S. PATENT DOCUMENTS

| | | | | |
|---|---|---|---|---|
| 2,956,248 | A * | 10/1960 | Strand | H01P 3/14 |
| | | | | 333/248 |
| 4,504,806 | A * | 3/1985 | Conn | H01P 3/20 |
| | | | | 333/248 |
| 4,825,395 | A * | 4/1989 | Kinser, Jr | H01H 13/702 |
| | | | | 361/679.28 |
| 4,878,293 | A * | 11/1989 | Kinser, Jr | H05K 1/028 |
| | | | | 29/850 |
| 5,075,649 | A * | 12/1991 | Pellegrineschi | H01P 5/04 |
| | | | | 342/361 |
| 5,970,580 | A * | 10/1999 | Katoh | G06F 1/1616 |
| | | | | 16/337 |
| 7,469,451 | B2 * | 12/2008 | Hashizume | G06F 1/1683 |
| | | | | 16/225 |
| 8,310,844 | B2 * | 11/2012 | Hashimoto | G06F 1/1683 |
| | | | | 361/755 |
| 9,019,033 | B2 * | 4/2015 | McCarthy | H01P 5/00 |
| | | | | 333/24 R |
| 9,287,903 | B2 * | 3/2016 | Takeda | H04B 1/034 |
| 9,658,654 | B1 * | 5/2017 | Wu | G06F 1/1683 |
| 10,066,868 | B2 * | 9/2018 | Dolinsek | E05D 3/02 |
| 10,103,417 | B2 * | 10/2018 | Gomberg | H01Q 1/288 |
| 10,205,217 | B2 * | 2/2019 | Svendsen | H01Q 1/2258 |
| 10,331,177 | B2 * | 6/2019 | Ghosh | G06F 1/1681 |
| 10,760,311 | B2 * | 9/2020 | Regimbal | E05D 7/04 |
| 11,339,594 | B2 * | 5/2022 | Regimbal | G06F 1/1681 |
| 2005/0239520 | A1 * | 10/2005 | Stefansen | H04M 1/0243 |
| | | | | 455/575.1 |
| 2006/0140572 | A1 | 6/2006 | Ruiz | |
| 2006/0238968 | A1 * | 10/2006 | Maatta | H04N 1/00525 |
| | | | | 361/679.01 |
| 2007/0032275 | A1 * | 2/2007 | Suzuki | G06F 1/1681 |
| | | | | 439/165 |
| 2011/0026443 | A1 * | 2/2011 | Okada | H01P 1/17 |
| | | | | 455/39 |
| 2011/0194240 | A1 * | 8/2011 | Hansen | H01Q 1/2266 |
| | | | | 361/679.01 |
| 2012/0093041 | A1 * | 4/2012 | Takeda | H01P 1/06 |
| | | | | 455/90.3 |
| 2012/0119969 | A1 * | 5/2012 | MacDonald | H01L 23/66 |
| | | | | 343/841 |
| 2012/0182094 | A1 | 7/2012 | Kawamura | |
| 2013/0183902 | A1 * | 7/2013 | McCarthy | H01P 5/00 |
| | | | | 455/41.2 |
| 2015/0169009 | A1 | 6/2015 | Ghosh et al. | |
| 2016/0161994 | A1 * | 6/2016 | Lee | G06F 1/1681 |
| | | | | 16/385 |
| 2017/0200997 | A1 * | 7/2017 | Gomberg | H01P 1/122 |
| 2017/0255235 | A1 * | 9/2017 | Wu | G06F 1/1683 |
| 2017/0300279 | A1 | 10/2017 | McCormack et al. | |
| 2018/0246546 | A1 * | 8/2018 | Ghosh | G06F 1/1681 |
| 2019/0050028 | A1 * | 2/2019 | Chung | F16C 11/04 |
| 2019/0169896 | A1 * | 6/2019 | Regimbal | E05D 7/04 |

* cited by examiner

Single Rotator

Dual Rotator

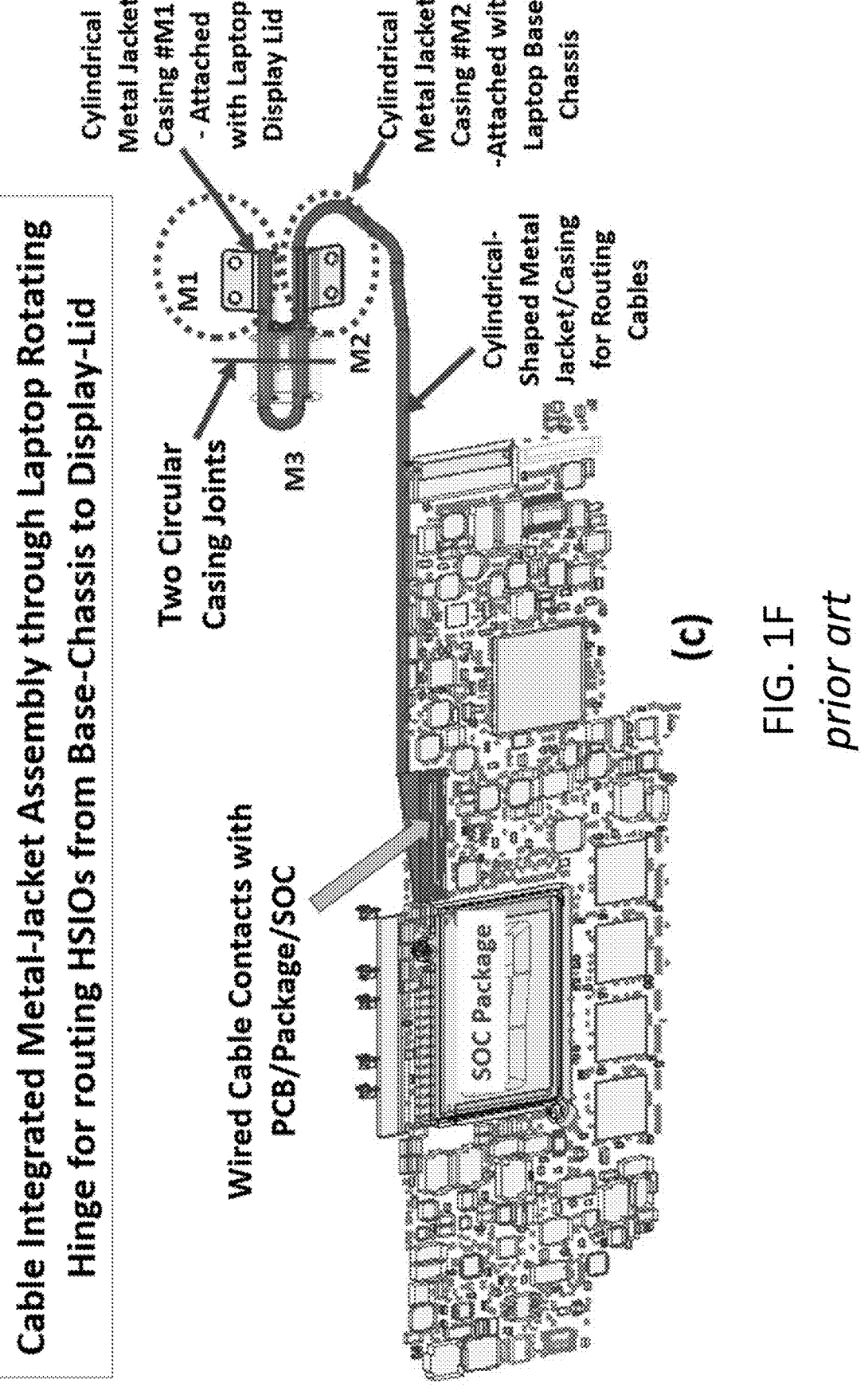

Cable Integrated Metal-Jacket Assembly through Laptop Rotating Hinge for routing HSIOs from Base-Chassis to Display-Lid Cylindrical Metal Jacket Casing #M1 - Attached with Laptop Display Lid Cylindrical Metal Jacket Casing #M2 -Attached with Laptop Base Chassis Two Circular Casing Joints Cylindrical-Shaped Metal Jacket/Casing for Routing Cables Wired Cable Contacts with PCB/Package/SOC SOC Package (c)

Rotating Circular Waveguide Structure

Metal Part-1

Sleeve Part-3

Metal Part-2

Rotation Cut Section with Sleeve

Port2

Port1

Circular Waveguide Mode For Rotation

1100

ROTATING CIRCULAR WAVEGUIDE CHANNEL FOR FOLDABLE ELECTRONIC DEVICES

TECHNICAL FIELD

The disclosure described herein generally relates to rotating circular waveguides and, in particular, to a rotatable circular waveguide structure that leverages the use of an electronic device hinge structure to eliminate wired interconnections between rotating device components.

BACKGROUND

Next generation, foldable electronic devices often require high-data rate cables to be routed through a hinge from the base (chassis) portion to the lid (display) portion. These high-data rate cables may carry video or other data signals (e.g. 40 Gbps and greater), and are typically implemented as high-speed interconnect I/O (HSIO) cables, which must withstand dynamic bend cycles (i.e. as the chassis and display are rotated with respect to one another) while maintaining high-data-rate performance. The reliability of these high-data rate cables is a significant issue when such repeated rotational use causes mechanical stress on the wired interconnects, which can eventually lead to failure. This issue is further complicated as the bend radius of the hinge becomes even smaller for next generation platforms with thinner form factors.

Moreover, the mechanical assembly of the wired interconnects such as flexible flat cable (FFCs), flexible printed circuits (FPCs), and coaxial cables through the hinge adds further assembly constrains and overall cost, particularly as such components may require the use of high performance materials. This issue is exacerbated as high-end devices may require a greater number of FPCs, FFCs, coaxial cables, and connectors to support the higher data rates. Thus, the current solutions of coupling high speed data signals between the chassis and display portions of electronic devices while withstanding the stress caused by repeated rotation or bending of these components, are inadequate.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which:

FIGS. 1A-1F illustrate various views of conventional electronic device construction, components, and signal routing techniques.

The present disclosure will be described with reference to the accompanying drawings. The drawing in which an element first appears is typically indicated by the leftmost digit(s) in the corresponding reference number.

DETAILED DESCRIPTION

Figure 1A:
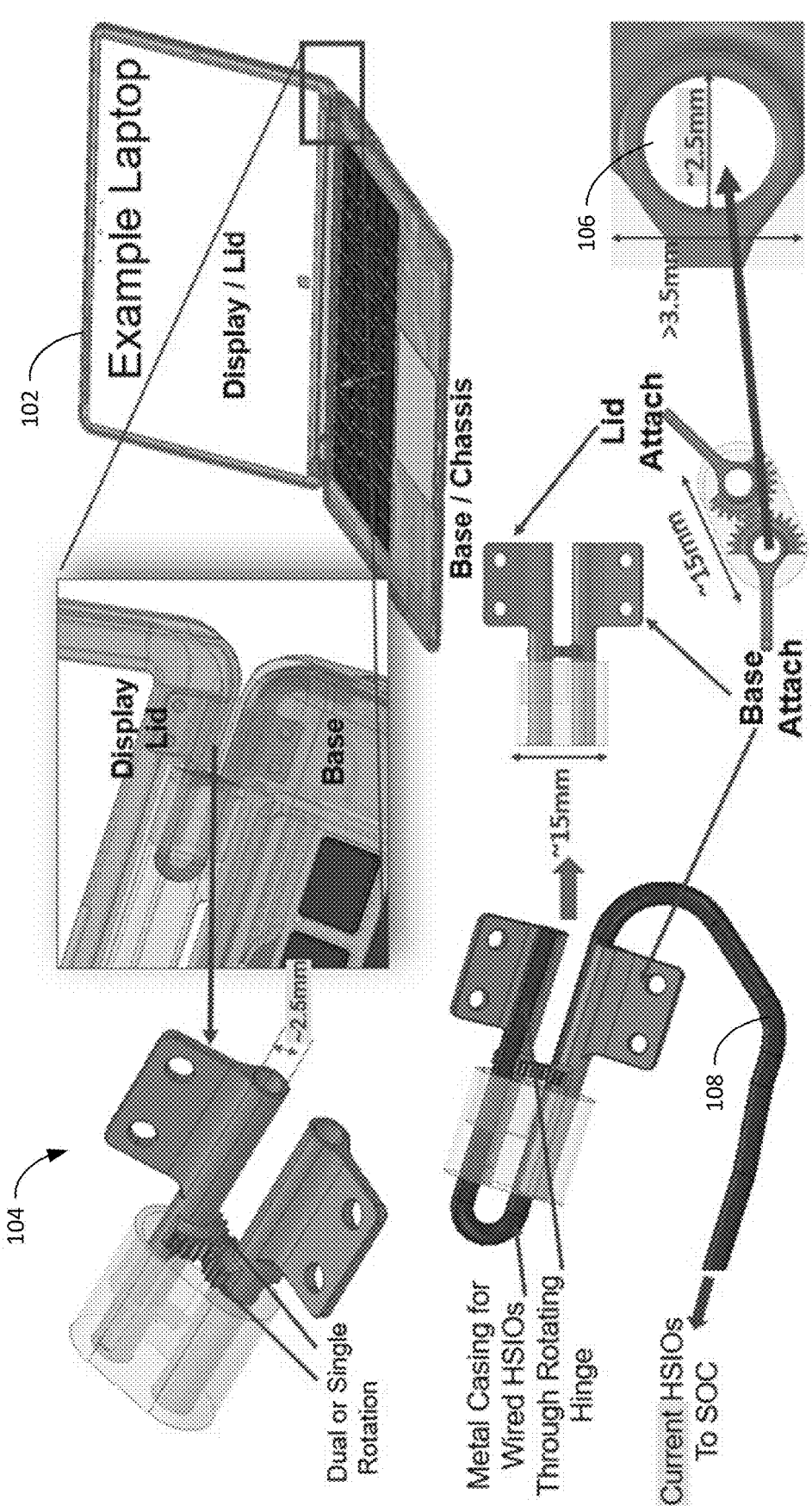

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Technological Overview of Signal Routing Solutions in Foldable Devices

Again, current solutions to couple high speed data signals between movable portions of electronic devices to withstand mechanical stress is inadequate. The holes through the hinge structures of such devices may be used for cable routing. Thus, this issue is further complicated as the hinge diameters of electronic devices are reduced in favor of smaller and lighter systems, as the number of connectors/cables running coaxial cables through the rotating mechanical hinge presents challenges for future foldable devices with higher data-rate needs. For instance, the bandwidth limit of micro-coax cables to support multi-lane signaling requirements of projected use cases creates the need for several parallel cables to be utilized, each being routed through the hinge.

The use of multiple cables in this way creates mechanical challenges and integration overhead due to the need for multiple connectors.

Furthermore, conventional FPC/FFC-based HSIO interconnects with high-data rate performance require high-quality and costly substrate materials, and the interconnects will be twisted during the rotation of the lid/base, resulting in performance degradation. This leads to noticeable issues such as visible display flickering after repeated openings/closings and folding at different angles. Also, for smaller radius bends (e.g. 1-2 mm), the cables often break within 100 cycles or fewer. Recently, to make the display thinner, the trend of integrating the cable into the display has significantly increased repair costs if the cables break, as this requires that the entire display be replaced.

Thus, in addition to the use of FFCs, FPCs, and/or coaxial cables with connectors, optical fiber based high-data rate connections are being proposed as another viable option. However, this still represents an inflexible coupling solution requiring a mechanical assembly through the hinge, is not cost effective, and exhibits similar reliability issues from mechanical stress as with coaxial cable connections. Further, optical fiber-based alternatives using vertical-cavity surface emitting laser (VCSEL)-based options for high-data rate connections present mechanical assembly and other cable integration overhead.

Alternative wireless designs have also been proposed to support the transfer of high-speed data signals between electronic device components, although such designs require a millimeter-wave cabling system and bulky hinges as a result of the integration of mm-wave chips on the hinge. Other hinge proposals include wireless IOs using antenna-integrated RFICs for a wireless connection over the laptop hinge air-gap between the chassis and display portions, which may include the use of antenna-integrated mm-wave RFIC-based wireless links over the foldable laptop base to display air-gaps. But such links are also prone to interference, base-to-display link-discontinuity, as well as security issues, and may require manufacturers to acquire regulatory approvals for certain frequencies of interest.

Technological Overview of the Use of a Rotatable Circular Waveguide Structure for Signal Routing in Foldable Devices The solutions described herein address these issues by providing a shielded and wire-free approach to route data signals between two portions of an electronic device that are moved (i.e. rotated, folded, bended, etc.) with respect to one another, as further discussed below. These solutions address wired-IO performance degradation, cost-increases, as well the mechanical assembly complexities and overhead for high-data rate HSIO integration in electronic device platforms. The solutions described herein may leverage the use of space identified with existing rotating hinge metal structures and/or HSIO cable casing metal structures to implement a rotatable circular waveguide structure, which may be coupled between any suitable portions of an electronic device, such as the chassis and display portions. The rotatable circular waveguide structure may comprise any suitable number of circular waveguide sections and rotatable junctions, and is configured to enable the communication of (i.e. unidirectional or bidirectional) data signals between the different portions of the electronic device via the propagation of electromagnetic radiation within the circular waveguide sections. In this way, the rotatable circular waveguide structure as described herein may obviate the need for base-to-display wired HSIOs in electronic devices requiring the communication of high rate data signals (such as >40 Gbps).

To do so, the solutions described herein may advantageously leverage the existing rotating hinge metal structures and holes for routing the circular waveguide sections of the rotatable circular waveguide structure. This enables mechanically robust high-data-rate communications over electronic device junctions that experience frequent movement with respect to one another. As further discussed herein, the waveguide structure may be based upon smaller diameter circular waveguides (such as those supporting electromagnetic signals having frequencies exceeding 100 GHz), which may be routed through the existing metal structures of the electronic device rotating hinge. The rotatable circular waveguide structure may utilize the space occupied by the metal casings that enclose existing cables connecting the chassis and display portions for the circular waveguide sections of the rotatable circular waveguide structure. Optionally, the metal casings may be replaced or modified to realize the circular waveguide sections of the rotatable circular waveguide structure.

The circular waveguide structure may comprise different circular waveguide sections, any suitable number of which may be referred to herein simply as circular waveguides. Thus, one or more circular waveguide sections may form a circular waveguide that is coupled to the chassis portion of the electronic device, and one or more circular waveguide sections may also form a circular waveguide that is coupled to the display portion of the electronic device. In each case, each circular waveguide may be coupled to the different portions of the electronic device via a respective radio frequency integrated circuit (RFIC) transition, which in turn is coupled to or forms part of an RFIC package. This RFIC package may comprise EM couplers configured to excite the desired circular electromagnetic modes to enable electromagnetic wave propagation within the circular waveguide sections of the rotating circular waveguide structure. The circular waveguide sections may be disposed within the electronic device to provide flexibility in placement of the RFIC packages close to the hinge region, proximate to an SoC package in the PCB of the chassis portion or the display portion, etc. As discussed in further detail herein, the circular waveguide sections may be air-filled, or be filled with any suitable materials such as plastic, dielectric, etc. The rotatable circular waveguide structure may comprise any suitable number of rotating junctions coupling circular waveguide sections to one another, which may be placed within the hinge area or other areas of the electronic device at which rotation is anticipated.

The solutions described herein eliminate the mechanical challenges and assembly overhead of wired high-speed interconnects (HSIOs). The solutions described herein also eliminate the need for connector assembly and any possible degradation of high-data-rate links between the chassis and the display portions due to cable and/or connector wear. Moreover, the solutions described herein enable secure and interference-free high-data-rate links and mitigate any regulatory approval needs. The use of the rotatable circular waveguide structure as discussed herein also provides a flatness of the low-loss channel over a considerable bandwidth for the desired application, ensuring reduced equalization needs with minimized power consumption and scalability to higher data rates.

It is noted that although described herein with respect to a rotating (i.e. foldable) electronic device such as a laptop computer, this is a non-limiting and illustrative application. The rotatable circular waveguide structure described in further detail herein may be implemented in accordance with any suitable type of device that may or may not comprise moving components, although the use of rotating junctions may be particularly useful to provide rotation for implementations in which the movement of connected parts is anticipated. In any event, the solutions as described herein may be implemented in any suitable type of device or devices to carry data signals via a circular waveguide structure to support one or more data links.

Conventional Signal Routing Solutions

Figure 1B:
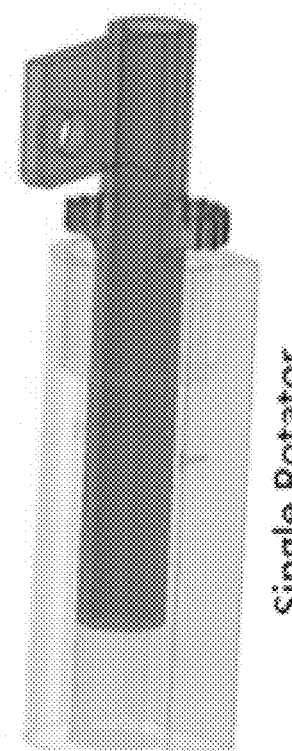
Figure 1B:
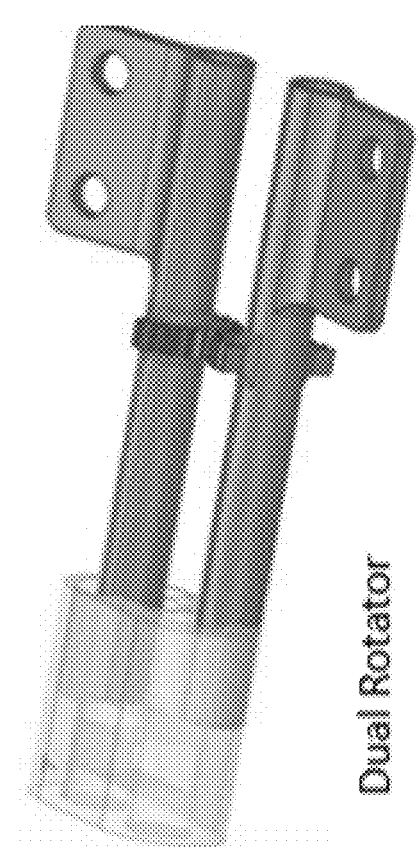

FIGS. 1A-1F illustrate various views of conventional electronic device construction, components, and signal routing techniques. FIG. 1A illustrates several views with respect to the conventional routing of HSIO signals through a hinge in an electronic device. As shown in FIG. 1A, the electronic device comprises a laptop computer, although the use of the rotatable circular waveguide structure as discussed herein may be implemented in any suitable type of electronic device. The electronic device 102 may comprise a hinge structure 104, such as the single or dual rotator configurations as shown in FIG. 1B. The single hinge rotator configuration as shown in FIG. 1B provides for a maximum rotation of 180-degrees between coupled components, such as the chassis and display portions. For other designs in which additional rotation is desired exceeding 180 degrees, such as convertible devices that may be placed into both laptop and tablet modes, the dual hinge rotator configuration as shown in FIG. 1B may be implemented to provide a full 360 degree rotation.

Regardless of the particular hinge configuration, current laptop designs typically use a maximum diameter of 2.5 mm for the hinge opening or hole 106, as shown in the right portion of FIG. 1A. Although the solutions described herein are not limited to such configurations, the dimensions of the hinge structure and opening are shown in FIG. 1A to illustrate that it is feasible for the rotatable circular waveguide structure as described herein to utilize this hinge opening space for routing one or more sections of the circular waveguide. Moreover, and as shown in left side of FIG. 1A, conventional laptop designs may route the HSIO cables through this hinge hole, which may be wrapped in a metal casing 108 to eliminate or reduce EMI/RFI. In such a case, the entire metal casing 108 is routed through the hinge hole 106 as shown in FIG. 1A.

In some scenarios, the solutions as described herein may implement one or more portions of such an existing metal casing 108 as one or more sections of the rotatable circular waveguide structure, the structural details of which are further discussed below. In other words, in accordance with such scenarios, portions of the metal casing 108 may be repurposed to propagate electromagnetic radiation in accordance with a suitable circular waveguide mode. This may include re-using the metal casing 108 by cutting the metal casing 108 and inserting rotatable junctions coupling the various sections to one another, thereby enabling rotation of the metal casing 108 at these rotatable junctions, as further discussed herein. In other scenarios, the metal casing 108 may not be entirely circular in shape, or may not be suitable for being reconfigured to propagate electromagnetic radiation via a suitable circular waveguide mode. In such scenarios, one or more portions (or the entirety of) the metal casing 108 may be replaced with the respective circular waveguide sections as further discussed herein.

In any event, the solutions as described herein may be implemented in existing electronic devices and/or as part of a new electronic device design. Furthermore, the metal casing 108 is illustrated in FIG. 1A as being routed through the hinge holes of a dual hinge rotator configuration as shown in FIG. 1B as noted above. However, this is a non-limiting and illustrative scenario and, as discussed in further detail below, the solutions as described herein may be implemented in accordance with single or dual hinge rotator configurations.

Figure 1C:
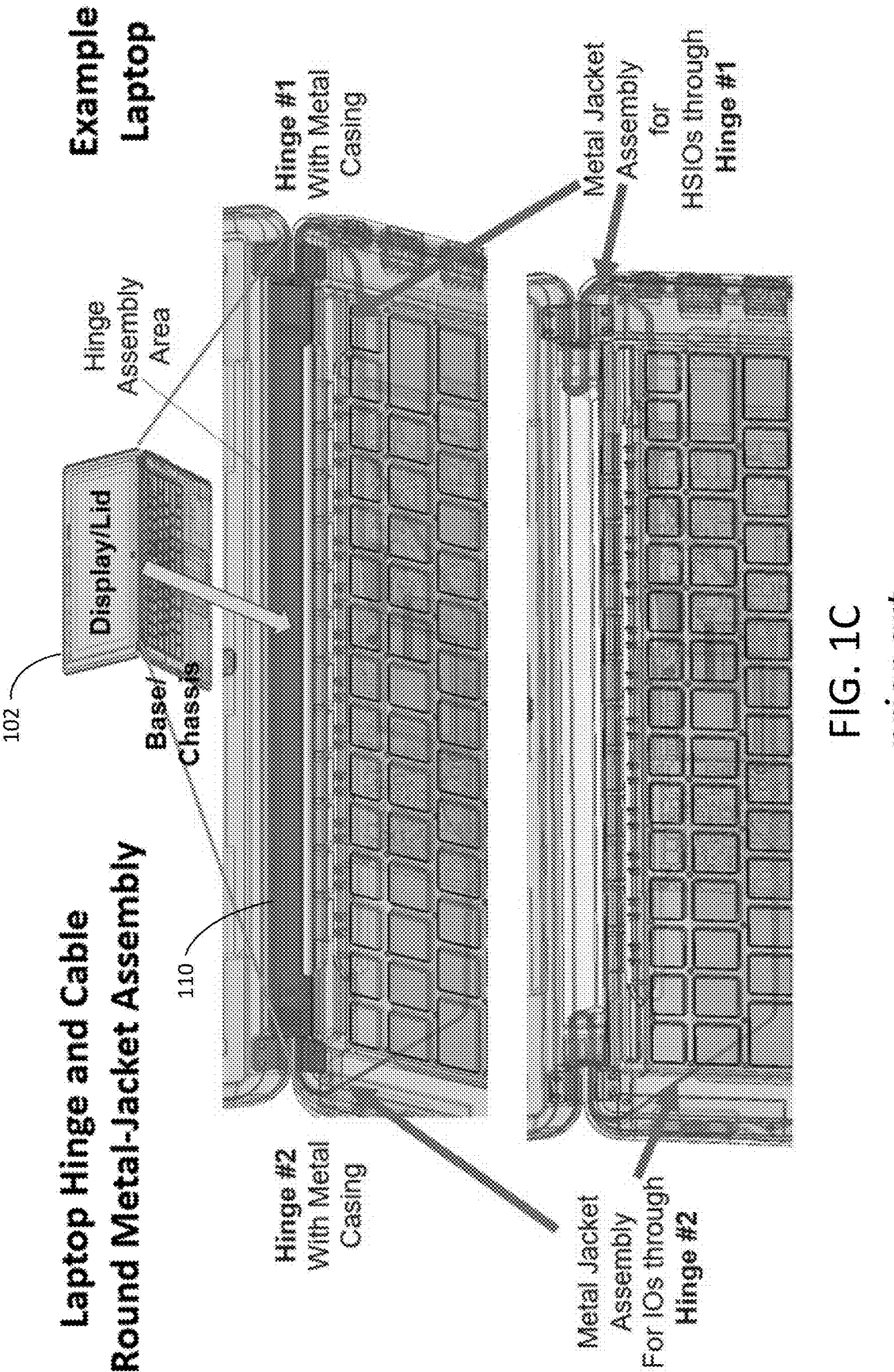
Figure 1D:
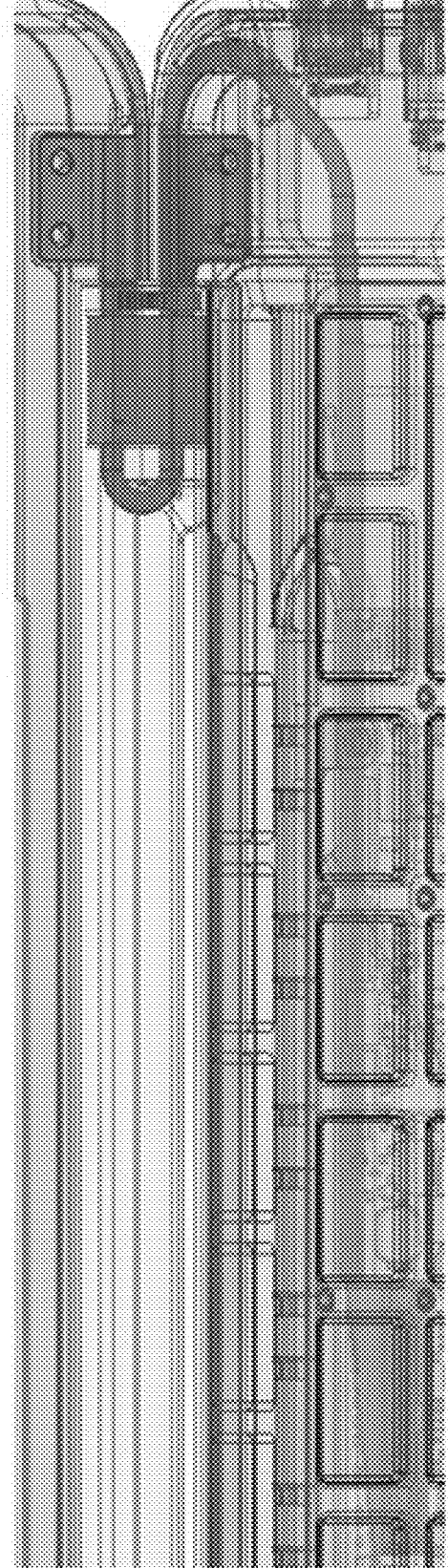
Figure 1D:
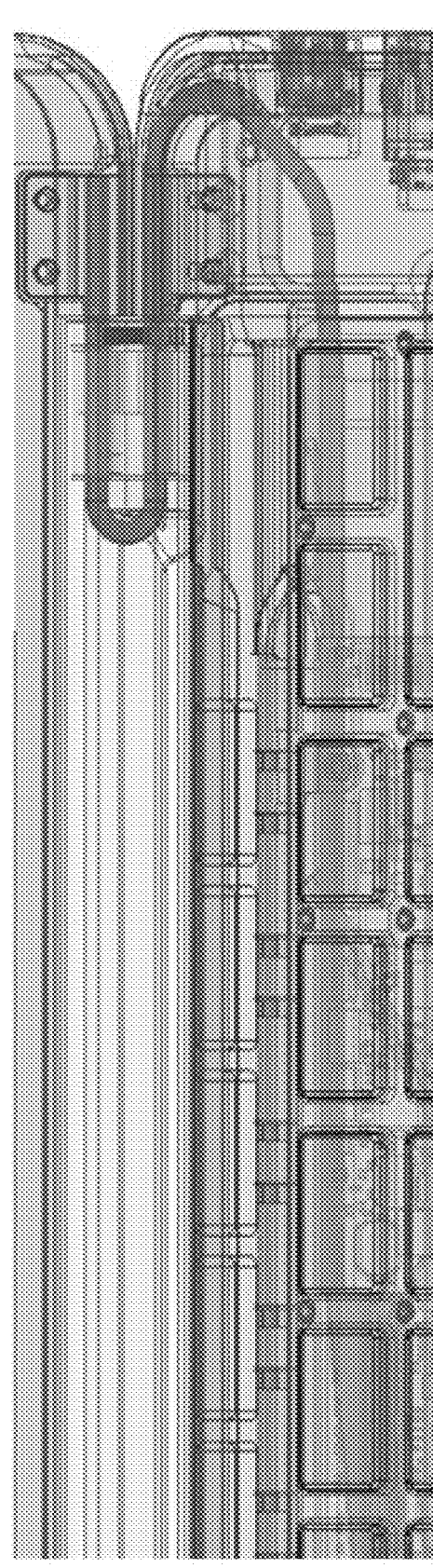

The solutions as described herein may function to route any suitable type of data signals among the different components of an electronic device in addition to or instead of high-speed data signals. For instance, FIG. 1C shows a conventional laptop having a hinge assembly area 110, which includes two dual rotation hinge, one per edge. The low-speed cables are routed inside of a circular metal jacket through the left hinge, and the high-speed cables are routed inside of a circular metal jacket through the right hinge. The solutions as described herein may be implemented in accordance with electronic device configurations having a hinge assembly area including any suitable number of hinge structures, with the two being shown in FIG. 1C as a non-limiting and illustrative scenario. The routing of the metal jacket assemblies for both the low-speed and the high-speed I/O data connections in the chassis portion of the electronic device 102 are also illustrated. Additional detail is shown in FIG. 1D regarding the high-speed cables that are routed inside of the circular metal jacket through the right hinge of the electronic device 102 as shown in FIG. 1C. The high data rate cables may be coupled to an SoC in the display and/or chassis portions, with the chassis portion SoC coupling being shown in FIG. 1C.

Again, the solutions as described herein may be implemented in existing electronic devices to realize data signal routings, such as those shown in FIG. 1C, and/or as part of a new electronic device design. Of course, due to the bandwidth provided by the use of a circular waveguide versus cable for data signals, the low- and high-speed data signals may be combined into a single circular waveguide propagation medium, thereby eliminating the need to utilize separate routing structures as in the conventional case as shown in FIG. 1C. In other words, the solutions as discussed herein may realize a single data routing medium for communicating any suitable number of data signals between different portions of an electronic device.

Figure 1E:
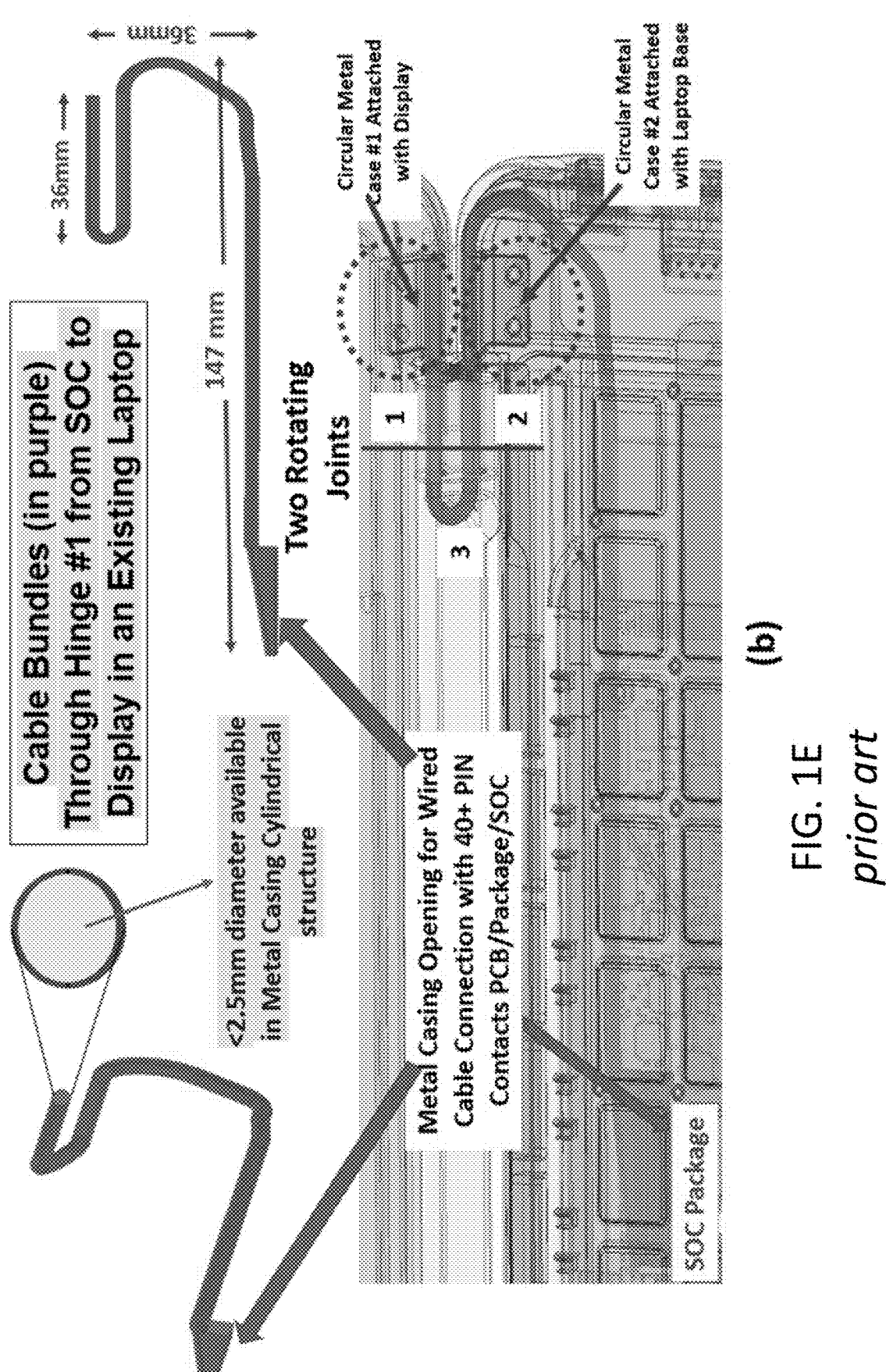

FIGS. 1D-1F show additional details regarding a conventional routing of high-speed data signals in a metal jacket from the display portion of the laptop to an SOC in the chassis portion via a hinge holes. The designed circular waveguide structures as discussed herein may be implemented within these high-speed data signal metal jacket form-factors, and may be routed with or without transitions to connect with the circular air-waveguide based rotating hinge structure as discussed herein. As shown in FIGS. 1E and 1F for a dual hinge rotator configuration, the metal casing for the high-speed cables may comprise two rotatable junctions, one per each hinge. The rotatable junctions allow these sections of the metal casing to rotate with respect to one another as the display and chassis portions are rotated. That is, a portion of the metal casing rotates to prevent twisting of the metal casing and accompanying cables, which would otherwise be subjected to stress when the chassis and display portions are rotated.

Signal Routing Solutions Using a Rotatable Circular Waveguide Structure

The solutions are further discussed herein leverage the use of rotatable junctions as part of a circular waveguide structure, which may be at similar or identical locations as those shown in FIGS. 1D-1F. These rotatable junctions allow the circular waveguides to rotate with respect to one another in a similar manner as the metal casing 108 as discussed with respect to the conventional cable routing solution of FIG.

Figure 1G:
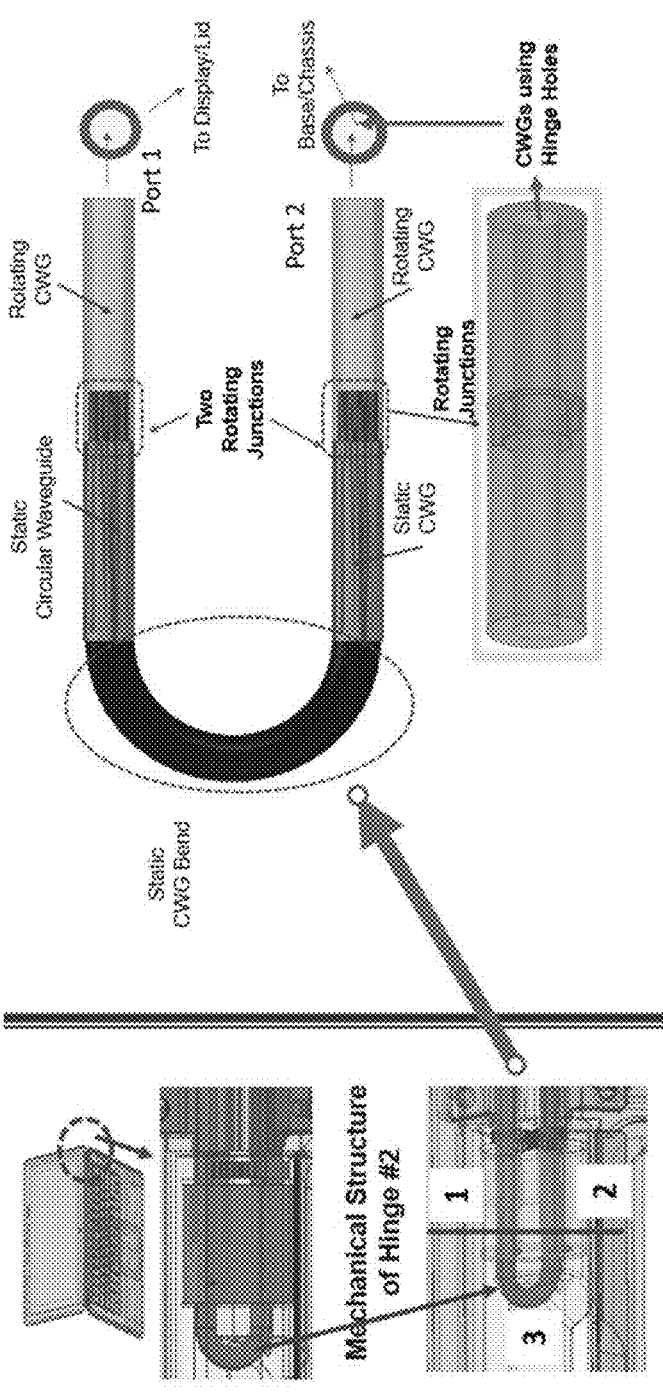
FIG. 1G illustrates a portion of a circular waveguide structure implementing rotating junctions, in accordance with the disclosure.

1A. This is illustrated in further detail in FIG. 1G, which identifies a static circular waveguide section and rotatable circular waveguide sections, which are coupled to one another via respective rotatable junctions. Each rotatable junction is identified with a respective port, one being identified with the chassis portion and the other being identified with the display portion. Additional details regarding the circular waveguides and the rotatable junctions are discussed below.

FIGS. 2A-2F illustrate various rotatable circular waveguide structures and routings, in accordance with the disclosure. It is noted that the rotatable circular waveguide structures as shown in FIGS. 2A-2F are provided by way of illustration and not limitation, and any suitable number of bends, circular waveguide sections, rotatable junctions, etc., may be implemented. Each of configurations as shown in FIGS. 2A-2F illustrates a rotatable circular waveguide structure 202 that, in each case, may comprise any suitable number of circular waveguide sections configured to enable the propagation of data signals between two different portions of an electronic device.

To do so, each of the circular waveguides (also referred to herein as circular waveguide sections with respect to the entirety of the rotatable circular waveguide structure 202) identified with the rotatable circular waveguide structure 202 may be implemented as any suitable type of circular waveguide. The circular waveguide sections may have any suitable diameter (such as less than 2.5 mm, less than 2 mm, etc.) based upon the desired propagating mode and frequency of the propagated electromagnetic radiation and/or data signals. The circular waveguide sections of the rotatable circular waveguide structure 202 may be comprised of any suitable materials to support propagation of electromagnetic radiation in accordance with any suitable number of circular waveguide modes, as further discussed herein. Each of the circular waveguide sections may be implemented as air filled waveguides or, alternatively, filled with any suitable material such as a dielectric material plastic, etc. The circular waveguide sections may be comprised of solid conductor materials such as metal, or may alternatively be implemented as non-conductive materials having one or more surfaces that are plated, sputtered, etc., with an electrically conductive material to enable electromagnetic wave propagation. The circular waveguide sections of the rotatable circular waveguide structure 202 may be flexible or rigid, and may be integrated as part of and/or mounted within the electronic device in which the rotatable circular waveguide structure 202 is implemented. The circular waveguide sections of the rotatable circular waveguide structure 202 may comprise the same type of filled material and/or type (i.e. flexible or rigid, plated, metal, etc.) or differ among the different circular waveguide sections.

As shown in FIGS. 2A-2F, the rotatable circular waveguide structure 202 may enable the communication of data signals between coupled portions of an electronic device, which may comprise a chassis portion and a display portion, such as those discussed above with respect to the electronic device 102. Thus, each portion of the electronic device may be coupled to a respective circular waveguide section of the rotatable circular waveguide structure 202. As an illustrative and non-limiting scenario referring to FIG. 2A, the rotatable circular waveguide structure 202 comprises the circular waveguide sections 202.1-202.5, which includes a circular waveguide section 202.1 that is coupled to the display portion 210, a circular waveguide section 202.5 that is coupled to the chassis portion 212, and a coupling section that is coupled to the circular waveguide sections 202.1, 202.5. Thus, the rotatable circular waveguide structure 202 enables data signals to be communicated between the display and chassis portions 210, 212 via the RFIC packages 204, 206. To do so, the circular waveguide section 202.1 may optionally comprise additional circular waveguide sections as discussed herein, and terminate in a coupling to the RFIC package 204. The circular waveguide section 202.5 may likewise optionally comprise additional sections as discussed herein, which terminate in a coupling to the RFIC package 206.

Each of the RFIC packages 204, 206 may be implemented as any suitable number and/or type of hardware, processing circuitry, etc., and may be configured to perform upconversion and/or downconversion of data signals that are propagated via the circular waveguide sections of the rotatable circular waveguide structure 202. The RFIC packages 204, 206 may additionally or alternatively comprise other suitable components to facilitate the conversion of data signals from the coupled circular waveguide sections 202.1, 202.5 to the relevant components within each respective portion of the electronic device. Thus, the RFIC packages 204, 206 may comprise or be coupled to exciters (such as EM couplers) impedance matching components, transitions, etc., that are configured to excite and/or couple any suitable circular waveguide mode and to ensure the communication of data signals via electromagnetic wave propagation. Additional details regarding the structure and operation of the RFIC packages 204, 206 are further discussed below.

Figure 2A:
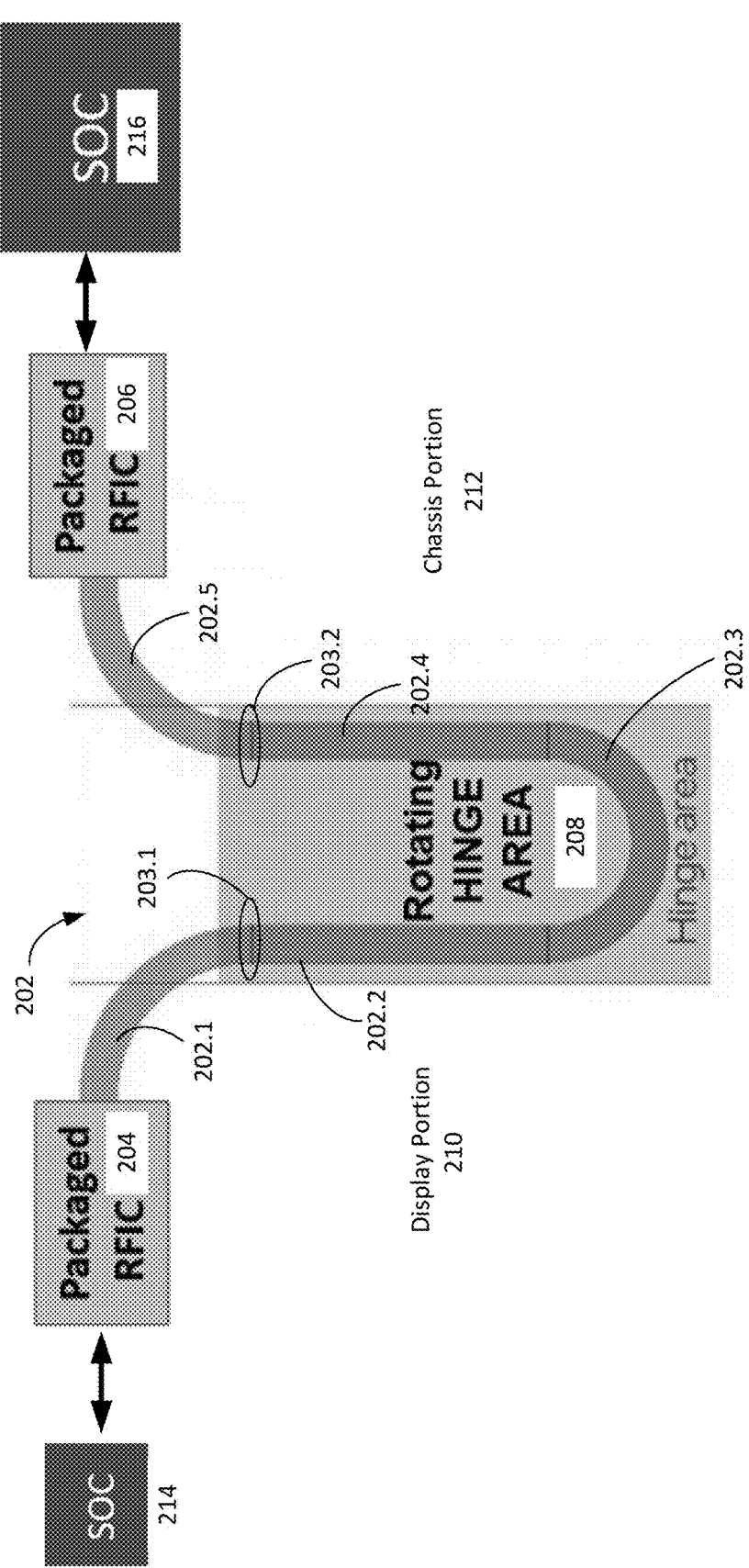
FIGS. 2A-2F illustrate various rotatable circular waveguide structures and routings, in accordance with the disclosure.
Figure 2B:
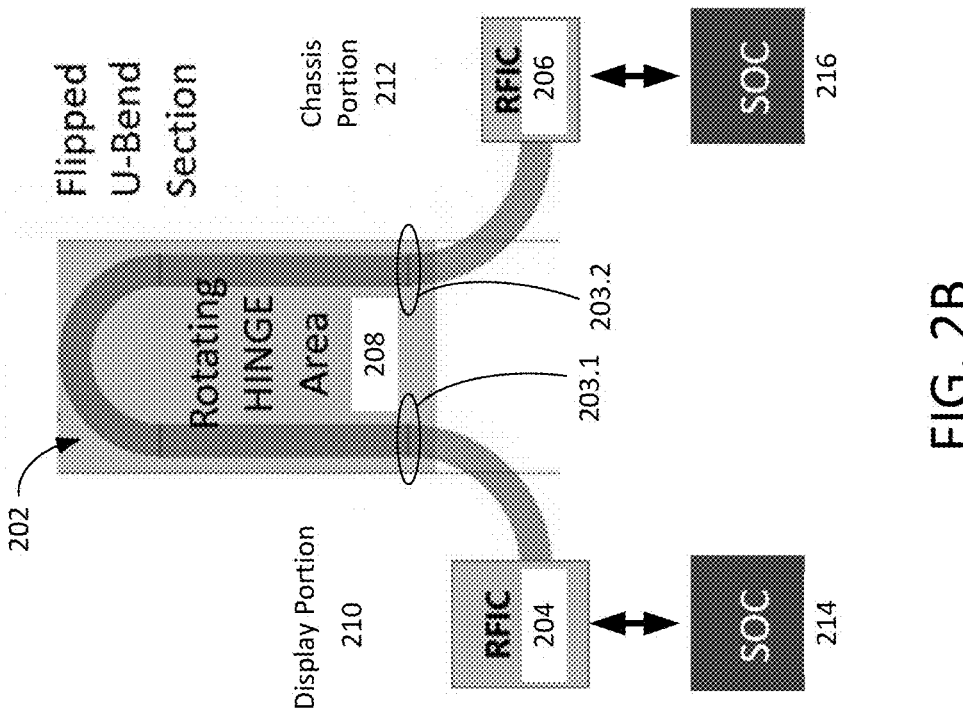
Figure 2C:
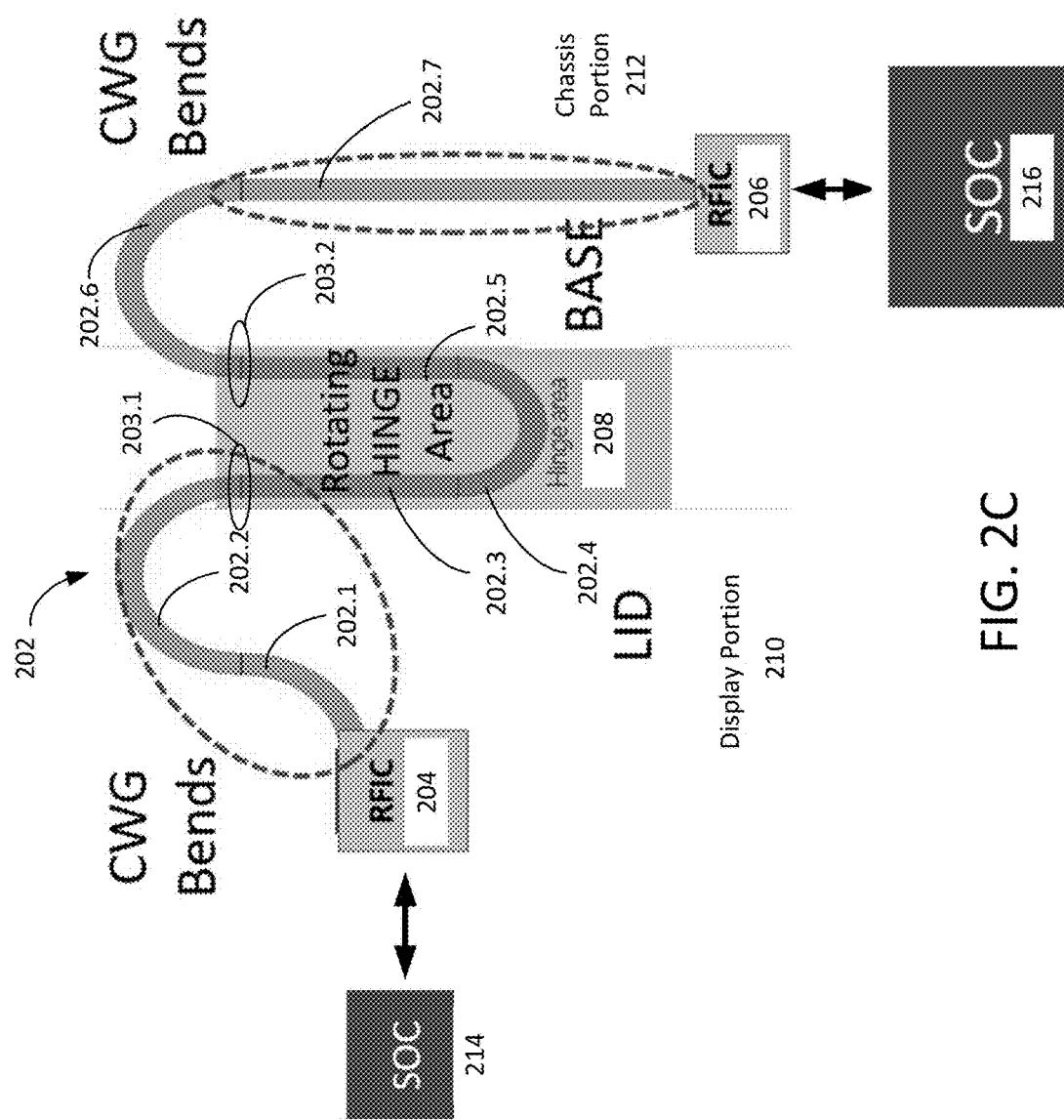

Furthermore, one or more of the RFIC packages 204, 206 may be coupled to one or more suitable components of the electronic device in which the rotatable circular waveguide structure 202 is implemented. In one scenario, these components may comprise a system on a chip (SoC), such as the SoCs 214, 216 as shown in FIGS. 2A-2C. Although illustrated in the Figures as SoCs, it will be understood that the SoCs 214, 216 may comprise additional or alternative components. The SoCs 214, 216 (as well as any other suitable components) to which each RFIC package 204, 206 is coupled may be identified with the same components that are present in an electronic device when conventional cable connections are implemented to transfer data signals between the display and chassis portions 210, 212, as discussed above with respect to the electronic device 102. Thus, the SoCs 214, 216 may comprise any suitable number and/or type of hardware circuitry, processing circuitry, executable software, etc., that facilitate receiving, transmitting, and/or processing of data signals via the RFIC packages 204, 206. In this way, the RFIC packages 204, 206 may function as adapters that convert the electromagnetic radiation propagated via the circular waveguide sections of the rotatable circular waveguide structure 202 to data signals that are received by the SoCs 214, 216, as well as converting the data signals transmitted by the SoCs 214, 216 to the electromagnetic radiation propagated via the circular waveguide sections of the rotatable circular waveguide structure 202.

Although illustrated as separate components, the RFIC packages 204, 206 may alternatively be integrated as part of the silicon of their respectively coupled SoCs 214, 216. That is, the RFIC packages 204, 206 may be integrated within the same FCBGA (Flip-Chip-Ball-Grid-Array) of a package of their respectively-coupled SoCs 214, 216. Alternatively, the RFIC packages 204, 206 may be heterogeneously integrated within the package of their respectively coupled SoCs 214, 216. As yet another alternative, the RFIC packages 204, 206 may be implemented as separate RFIC packages that may be placed next to the SoC on the motherboard or other circuit board implemented via the electronic device. The integration of the RFIC packages 204, 206 with the SoCs 214, 216 may be particularly useful when the rotatable circular waveguide structure 202 is installed as part of a newly-manufactured electronic device that considers this functionality, as opposed to the installation of the rotatable circular waveguide structure 202 to upgrade a conventional electronic device.

In the scenario illustrated in FIG. 2A, the coupling section comprises the circular waveguide sections 202.2, 202.3, 202.4, which couple the first and the second circular waveguides 202.1, 202.5 to one another. As shown in FIG. 2A, portions of the coupling section are routed through a hinge of the electronic device via a hole that may be implemented for cable routing, as noted above. The coupling section may thus be considered a "static" section of the rotatable circular waveguide structure 202, with the circular waveguide sections 202.2, 202.3, 202.4 being mounted in any suitable manner within the hinge assembly area as discussed herein. Again, this may include, in the present scenario, the circular waveguide sections 202.2, 202.4 being routed through the hinge holes of a hinge implemented via the electronic device in which the rotatable circular waveguide structure 202 is implemented, in a similar or identical manner as that discussed above for the routing of the metal cable casing 108 as shown in FIG. 1A for the dual rotator configuration. Thus, the circular waveguide portions 202.2, 202.3, 202.4 may remain stationary or have limited movement as the chassis and display portions 210, 212 are rotated with respect to one another.

The coupling section may comprise any suitable number of rotatable junctions, which may be a function of the number of circular waveguide sections within the coupling section. This may include the rotatable junctions 203.1, 203.2 as shown in FIG. 2A. Thus, for the scenario as shown in FIG. 2A, the coupling section is coupled to the circular waveguide portion 202.1 at the rotatable junction 203.1, and the coupling section is coupled to the circular waveguide portion 202.5 at the rotatable junction 203.2. Thus, the rotatable junctions 203.1, 203.2 enable a rotation of each respectively coupled circular waveguide section 202.1, 202.5 of the rotatable circular waveguide structure 202. In the scenario as shown in FIG. 2A, the circular waveguide sections 202.1, 202.5 are configured to be rotatable with respect to their respectively coupled circular waveguide sections 202.2, 202.4. Again, this rotation may be in response to the display portion 210 and the chassis portion 212 being rotated with respect to one another, such as when a user opens and closes the lid of a laptop.

The length, number of bends, number of circular waveguide sections, number of rotatable junctions, shape, routing, etc., of the rotatable circular waveguide structure 202 may be varied depending upon the particular implementation to provide different configurations, some of which are further discussed herein in a non-limiting and illustrative manner. The configuration of the rotatable circular waveguide structure 202 may be modified based upon the location of RFIC packages within the electronic device or other design driven parameters. Thus, for the waveguide structure 202 as shown in FIG. 2A, the use of the single circular waveguide portions 202.1, 202.5 may advantageously enable coupling with RFIC packages 204, 206 placed close to the rotating hinge area 208.

However, in the configuration 240 as shown in FIG. 2B, the shape of the coupling section may be flipped in the vertical direction with respect to the hinge of the electronic device. This flexibility allows for the RFIC packages 204, 206, and their accompanying ports, to be placed closer to their respective SoCs 214, 216 or closer to any other desired locations within the electronic device.

As another alternative, the configuration 260 as shown in FIG. 2C may be implemented with additional circular waveguide sections to enable the RFIC packages 204, 206 to be placed close to their respective SoCs 214, 216 or other suitable components. To do so, and as shown in FIG. 2C, the configuration 260 still comprises the coupling section as discussed above with respect to FIGS. 2A and 2B, which includes the circular waveguide sections 202.3, 202.4, 202.5 in this scenario. However, the rotatable junction 203.1 couples the circular waveguide section 202.3 to the circular waveguide section 202.2 to enable the circular waveguide section 202.2 to rotate with respect to the circular waveguide section 202.3 at the rotatable joint 203.1 as the chassis and display portions 210, 212 are rotated with respect to one another. The circular waveguide section 202.2 is coupled to the RFIC package 204 in this scenario via the additional circular waveguide section 202.1. Furthermore, the rotatable junction 203.2 couples the circular waveguide section 202.5 to the circular waveguide section 202.6 to enable the circular waveguide section 202.6 to rotate with respect to the circular waveguide section 202.5 at the rotatable joint 203.2 as the chassis and display portions 210, 212 are rotated with respect to one another. The circular waveguide section 202.6 is coupled to the RFIC package 206 in this scenario via the additional circular waveguide section 202.7. Thus, additional circular waveguide sections, bends, etc., may be implemented to provide flexibility with respect to the positioning of the RFIC packages 204, 206 within the electronic device.

Figures 2D, 2E:
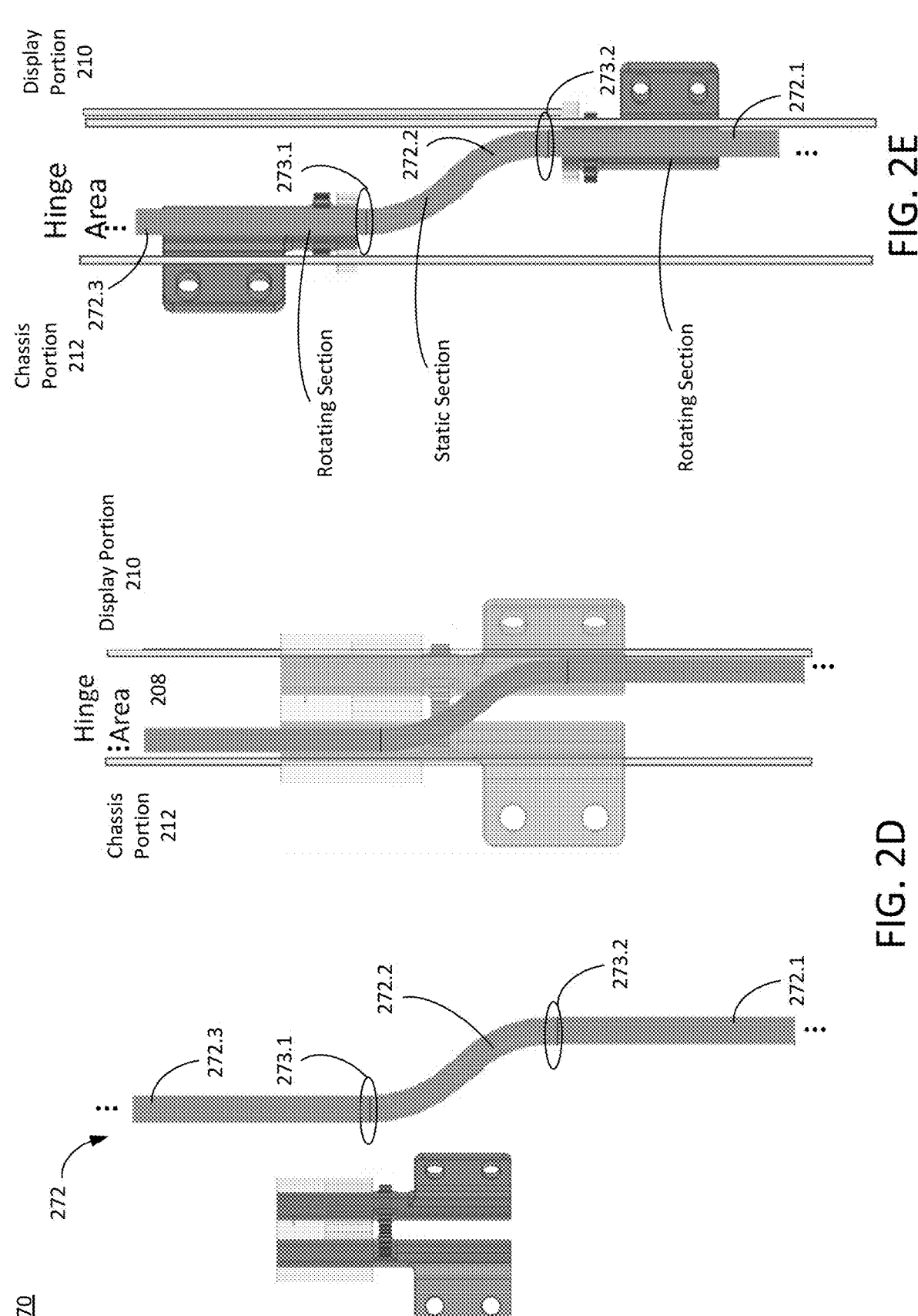
Figure 2F:
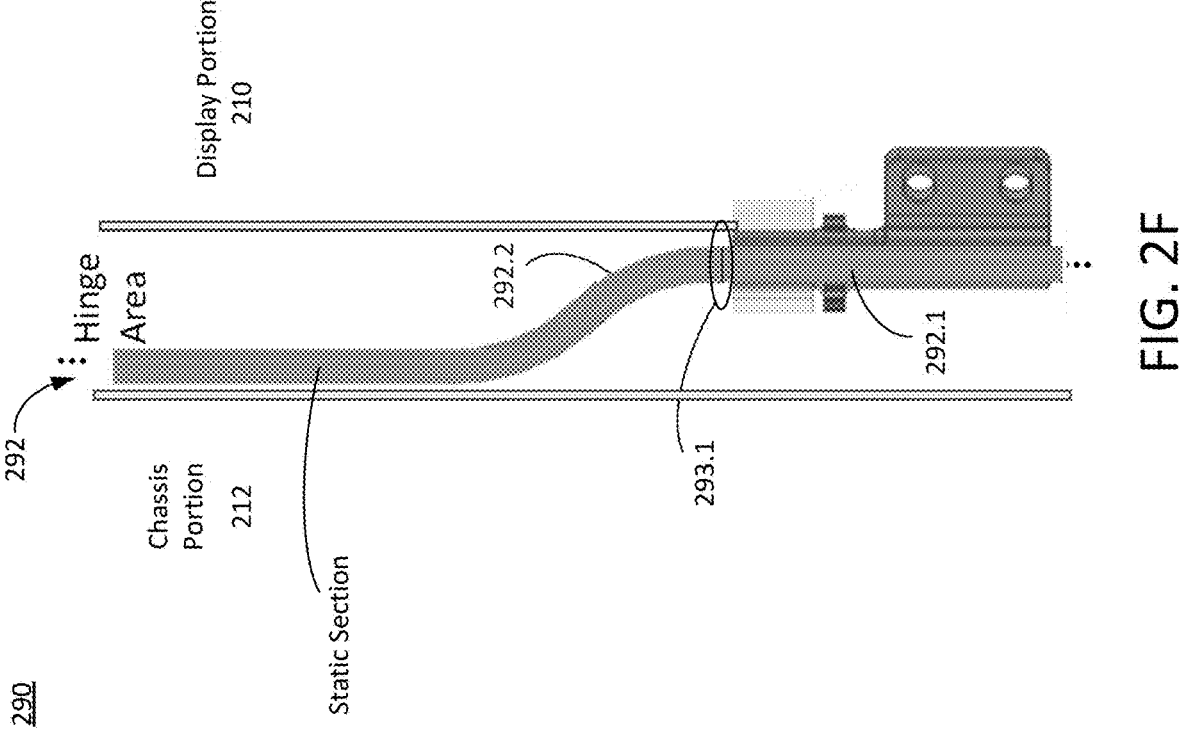

Additional configurations of the rotatable circular waveguide structure 202 are shown in FIGS. 2D-2F. It is once again noted that the rotatable circular waveguide structure 202 may comprise any suitable number of circular waveguide sections, with a portion of these sections being shown in FIGS. 2D-2F for purposes of brevity. Furthermore, the additional couplings within the electronic device are likewise not shown, such as the RFICs, SoC, etc.

The configuration 270 as shown in FIG. 2D may be implemented as part of a dual rotator hinge implementation, as was the case for the configurations as shown in FIGS. 2A-2C. However, the configuration 270 as shown in FIG. 2D illustrates a portion of a rotatable circular waveguide structure 272, which may be identified with the rotatable circular waveguide structure 202 and may be implemented with an alternative shape for the coupling portion than that of the configurations as shown in FIGS. 2A-2C. That is, the rotatable circular waveguide structure 272 as shown in FIG. 2D comprises the circular waveguide sections 272.1, 272.2, 272.3, with the circular waveguide section 272.2 as the coupling section. Therefore, the coupling section for the configuration 270 (as well as that of the configurations 280, 290) is "S-shaped," versus the "U-shaped" coupling section as shown in FIGS. 2A-2C.

As shown in FIG. 2D, the S-shaped coupling section 272.2 is coupled to the circular waveguide sections 272.1, 272.3 via respective rotatable junctions 273.2, 273.1. In this scenario, the coupling section 272.2 may function as the static circular waveguide section. The rotatable junction 273.1 couples the circular waveguide section 272.3 to the circular waveguide section 272.2 to enable the circular waveguide section 272.3 to rotate with respect to the circular waveguide section 272.2 at the rotatable joint 273.1 as the chassis and display portions 210, 212 are rotated with respect to one another. Additionally, the rotatable junction 273.2 couples the circular waveguide section 272.1 to the circular waveguide section 272.2 to enable the circular waveguide section 272.1 to rotate with respect to the circular waveguide section 272.2 at the rotatable joint 273.2 as the chassis and display portions 210, 212 are rotated with respect to one another. The routing of the circular waveguide sections 272.1, 272.2, 272.3 is shown in further detail on the right side of FIG. 2D, which illustrates that one or more portions of each of the circular waveguide sections 272.1, 272.2, 272.3 may be routed through the hinge holes of a dual rotator hinge implementation.

The configuration as shown in FIG. 2E may also be implemented as part of a dual rotator hinge implementation, and include an S-shaped coupling section 272.2, as was the case for the configuration as shown in FIG. 2D. The configuration as shown in FIG. 2E may be identical to that of FIG. 2D, but is shown to illustrate the compatibility of the configuration 270 with a different type of dual rotator hinge implementation. That is, the configuration as shown in FIG. 2E routes the circular waveguide sections 272.1, 272.3 through respective holes in separate hinges of a dual rotator hinge configuration, which may be spaced apart in the hinge assembly area of the electronic device. Again, the coupling section 272.2 is shown as the static section, whereas the circular waveguide sections 272.1, 272.3 are shown as the rotating sections, as was also the case for the configuration as shown in FIG. 2D.

The configuration 290 as shown in FIG. 2F may be implemented as part of a single rotator hinge implementation. The configuration 290 as shown in FIG. 2F illustrates a portion of a rotatable circular waveguide structure 292, which may be identified with the rotatable circular waveguide structure 202 and may be implemented with an alternative shape for the coupling portion than that of the configurations as shown in FIGS. 2A-2E. That is, the rotatable circular waveguide structure 292 as shown in FIG. 2F comprises the circular waveguide sections 292.1, 292.2, with the circular waveguide section 292.2 as the static coupling section. Therefore, the coupling section for the configuration 290 comprises both of the circular waveguide sections 272.2, 272.3 as shown in FIG. 2D-2E, which are integrated into a single static circular waveguide section in this configuration.

As shown in FIG. 2F, the coupling section 292.2 is coupled to the circular waveguide section 292.1 via a single rotatable junction 293.1 The rotatable junction 293.1 couples the circular waveguide section 292.1 to the circular waveguide section 292.2 to enable the circular waveguide section 292.1 to rotate with respect to the circular waveguide section 292.2 at the rotatable joint 293.1 as the chassis and display portions 210, 212 are rotated with respect to one another. The routing of the circular waveguide sections 292.1 is also shown through the hinge hole of the single rotator hinge implementation.

The Mechanical Structure of Circular Waveguide Junctions

As noted above, the rotatable circular waveguide structures 202, 272, 292 may include rotatable junctions to enable the rotation of circular waveguide sections with respect to one another. These rotatable junctions may be implemented in various ways, as further discussed herein with respect to FIGS. 3A-3B and FIG. 4. It is noted that the rotatable circular waveguide junctions are shown herein with a coupled sleeve design as a non-limiting and illustrative scenario. In other scenarios, the rotatable junctions may omit such sleeves such that the circular waveguide sections are in contact with one another. Thus, the static and rotating parts of the circular waveguide junctions as discussed herein may be in direct contact with one another or, alternatively, may include air-gaps. Regardless of the particular implementation, the rotatable junctions may or may not include the use of the notched/slotted configurations as further discussed herein.

Figure 3A:
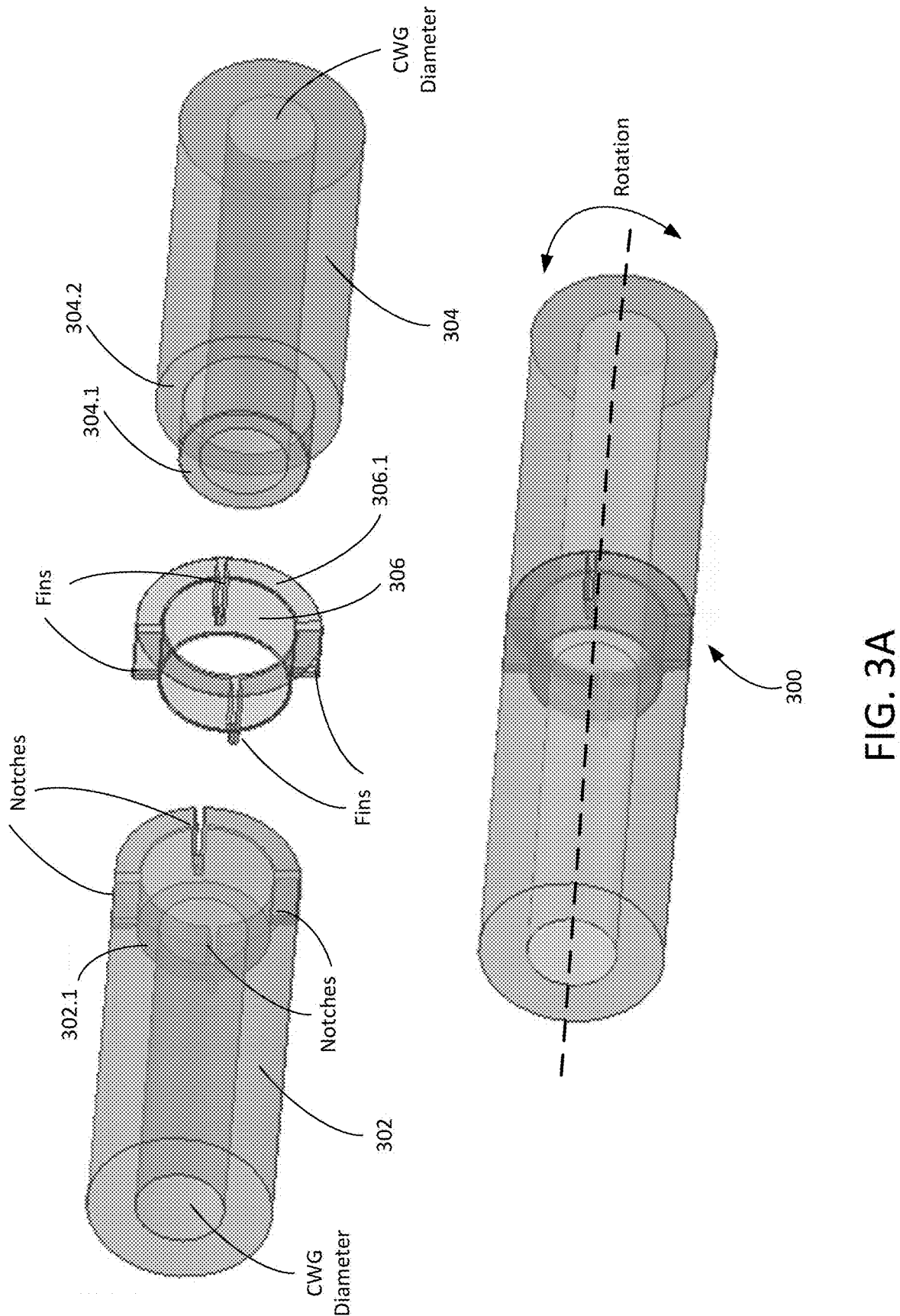
FIGS. 3A-3B illustrate a first rotatable circular waveguide junction, in accordance with the disclosure.

FIG. 3A illustrates additional details of a rotatable circular waveguide junction, in accordance with the disclosure. The rotatable circular waveguide junction as shown in FIG. 3A comprises a coupling of the circular waveguide sections 302, 304 with a sleeve 306. The circular waveguide sections 302, 304 may be identified with any of the circular waveguide sections as discussed herein that may utilize a rotatable junction, such as the circular waveguide sections 202.1, 202.2, 202.3, 202.4, 202.5, 202.6, 272.1, 272.2, 272.3, 292.1, 292.2, etc. Each of the circular waveguide sections 302, 304 forms a tubular shape and comprises a respective inner diameter as shown in FIG. 3A as the "CWG diameter." The CWG diameter forms the structure of the circular waveguide surface within which the electromagnetic radiation propagates, as further discussed herein.

The rotatable junction 300 is thus formed via a mated coupling between the circular waveguide sections 302, 304, which implement matching mating structures between the circular waveguide sections 302, 304, and the sleeve 306. That is, each of the circular waveguide sections 302, 304 may be machined, formed, or otherwise shaped having respective ends that are configured to be fit and coupled to one another via the sleeve 306 as shown in FIG. 3A. Thus, the mated coupling between the circular waveguide sections 302, 304 includes a coupling of the sleeve 306 with each of the and circular waveguide sections 302, 304 as shown in FIG. 3A. The sleeve 306 may be comprised of any suitable material to reduce the friction between the surfaces of the circular waveguide sections 302, 304 to allow for a rotation of the circular waveguide sections 302, 304 about the central axis of each circular waveguide section 302, 304. Thus, the sleeve 306 may comprise a non-conductive sleeve made of polytetrafluoroethylene (PTFE) or other suitable material for this purpose. Alternatively, the sleeve 306 may comprise an electrically conductive material that reduces the friction between the between the surfaces of the circular waveguide sections 302, 304.

Figure 3B:
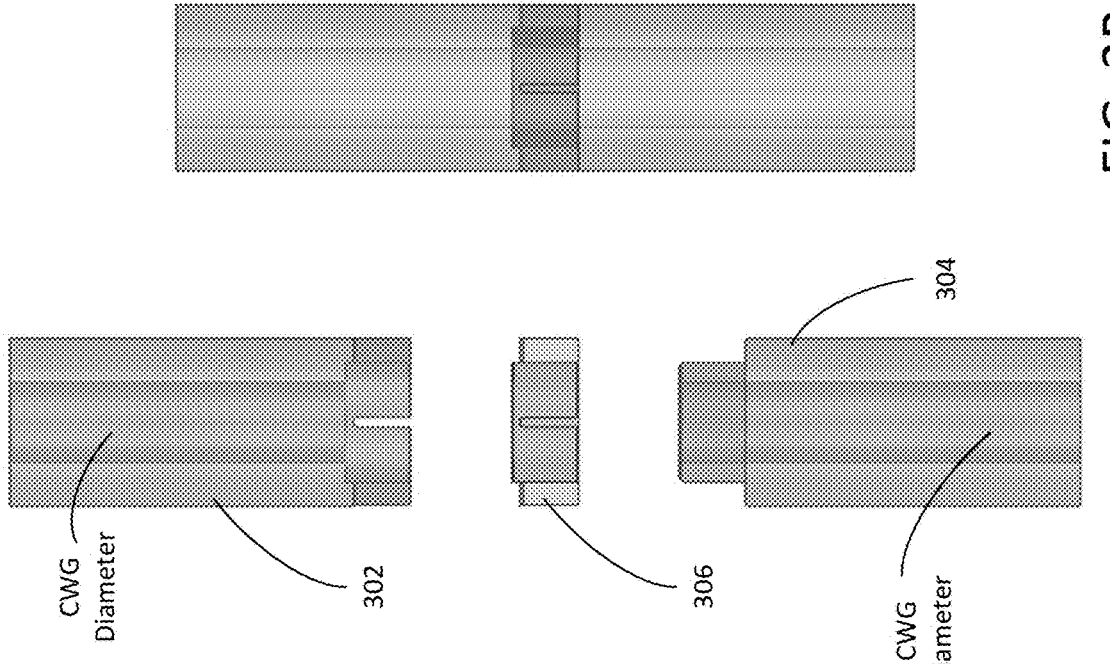

In any event, the sleeve 306 may comprise any suitable shape that is configured to fit or mate with a corresponding shape at the ends of each of the circular waveguide sections 302, 304. As shown in FIG. 3A, in one scenario this may comprise the sleeve 306 including any suitable number of tabs or fins, which align with and correspond to matching slots or notches in the circular waveguide section 302. The sleeve 306 also comprises an outer flange portion 306.1, which aligns with and corresponds to the cutback surface 304.2 of the circular waveguide section 304. As a result of this coupling arrangement, the conductive surfaces 302.1, 304.1 remain in contact with one another during rotation via the mated coupling arrangement, which is shown in the bottom of FIG. 3A. In other words, the mated coupling between the circular waveguide sections 302, 304 comprises a coupling via the sleeve 306 that maintains (at least a partial) galvanic coupling between the circular waveguide sections 302, 304 to enable a continuous conductive surface formed by the CWG diameter during rotation, thereby facilitating the propagation of guided electromagnetic radiation. An additional view of the rotatable junction 300 is shown in FIG. 3B.

Figure 4:
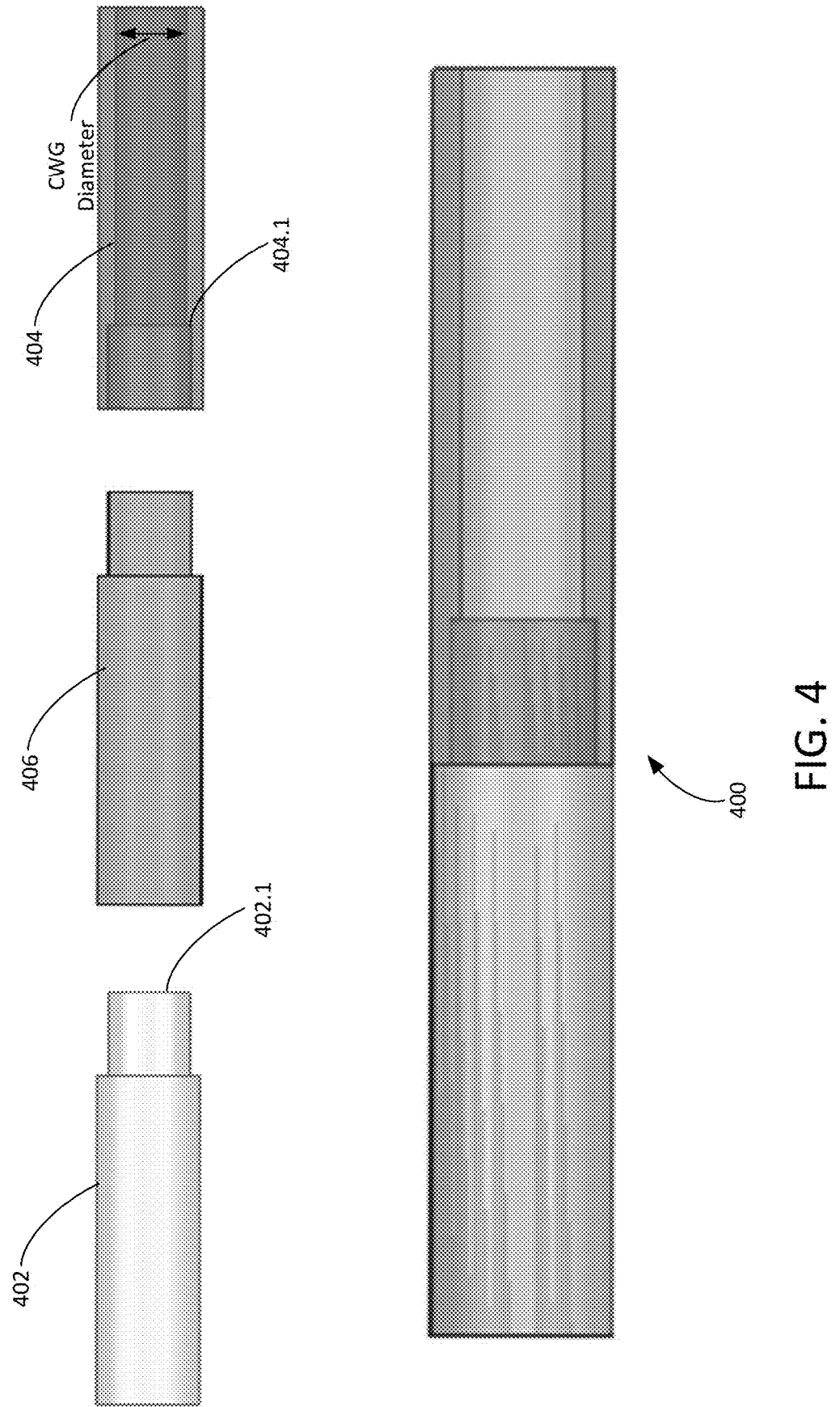
FIG. 4 illustrates a second rotatable circular waveguide junction, in accordance with the disclosure.

FIG. 4 illustrates additional detail of a rotatable circular waveguide junction, in accordance with the disclosure. The rotatable circular waveguide junction 400 as shown in FIG.

4 comprises a coupling of the circular waveguide sections 402, 404 with a sleeve 406. The circular waveguide sections 402, 404 may likewise be identified with any of the circular waveguide sections as discussed herein that may utilize a rotatable junction, as noted above with respect to FIGS. 3A-3B. Each of the circular waveguide sections 402, 404 also forms a tubular shape and comprises a respective inner diameter as shown in FIG. 4 as the "CWG diameter." The CWG diameter forms the structure of the circular waveguide surface within which the electromagnetic radiation propagates, as further discussed herein.

The sleeve 406 as shown in FIG. 4 may be formed over the circular waveguide section 402. Furthermore, like the sleeve 306, the sleeve 406 may comprise a non-conductive sleeve made of polytetrafluoroethylene (PTFE) or other suitable material for this purpose, or an electrically conductive material that reduces the friction between the surfaces of the circular waveguide sections 402, 404. In any event, the sleeve 406 may be formed over the circular waveguide section 402 in accordance with any suitable techniques, such as deposition, sputtering, etc. Furthermore, the circular waveguide section 404 may be shaped with a cutback as shown in FIG. 4, such that the conductive surfaces 402.1, 404.1 remain in contact with one another during rotation via the mated coupling arrangement between the circular waveguide sections 402, 404, as shown in the bottom portion of FIG. 4. In this way, the mated coupling arrangement ensures that the circular waveguide sections 402, 406 maintains (at least a partial) galvanic coupling between the circular waveguide sections 402, 404 to enable a continuous conductive surface formed by the CWG diameter during rotation to facilitate the propagation of guided electromagnetic radiation.

The rotatable junctions discussed herein implement sleeves to provide mechanical stability and durability, as well as easy assembly. However, these are provided as non-limiting and illustrative scenarios, and the rotatable junctions as discussed herein may implement alternative configurations. Such alternative configurations may include the use of air-gaps between the circular waveguide sections, and may not implement separate sleeve components. Air gaps may be implemented using any suitable type of air-gap choke design, including known designs. The rotatable junctions as discussed herein may be implemented using any suitable choke designs, with or without air-gaps, for easy mechanical assembly.

Rotatable Circular Waveguide Structure Simulation Data

Figure 5A:
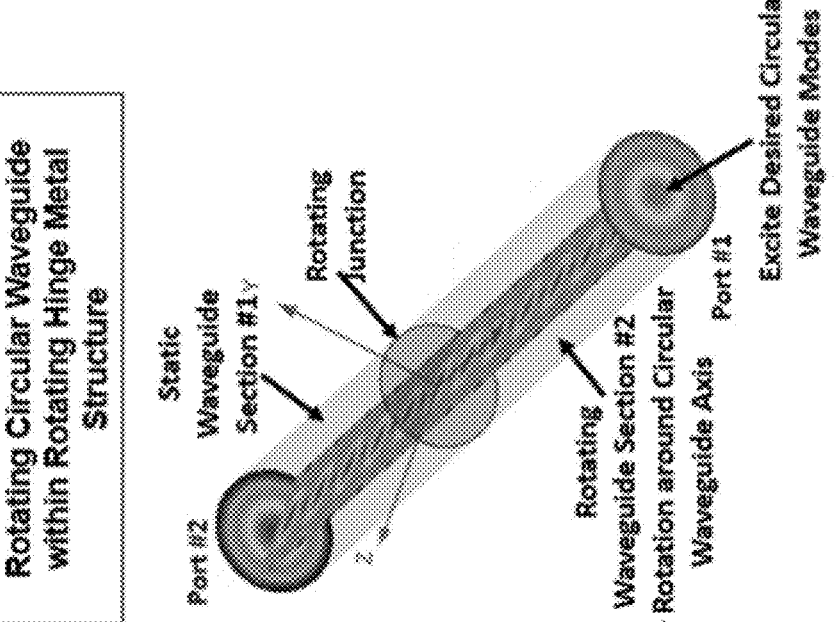
FIG. 5A illustrates simulated TM01 mode excitation of an ideal rotatable circular waveguide junction, in accordance with the disclosure.
Figure 5B:
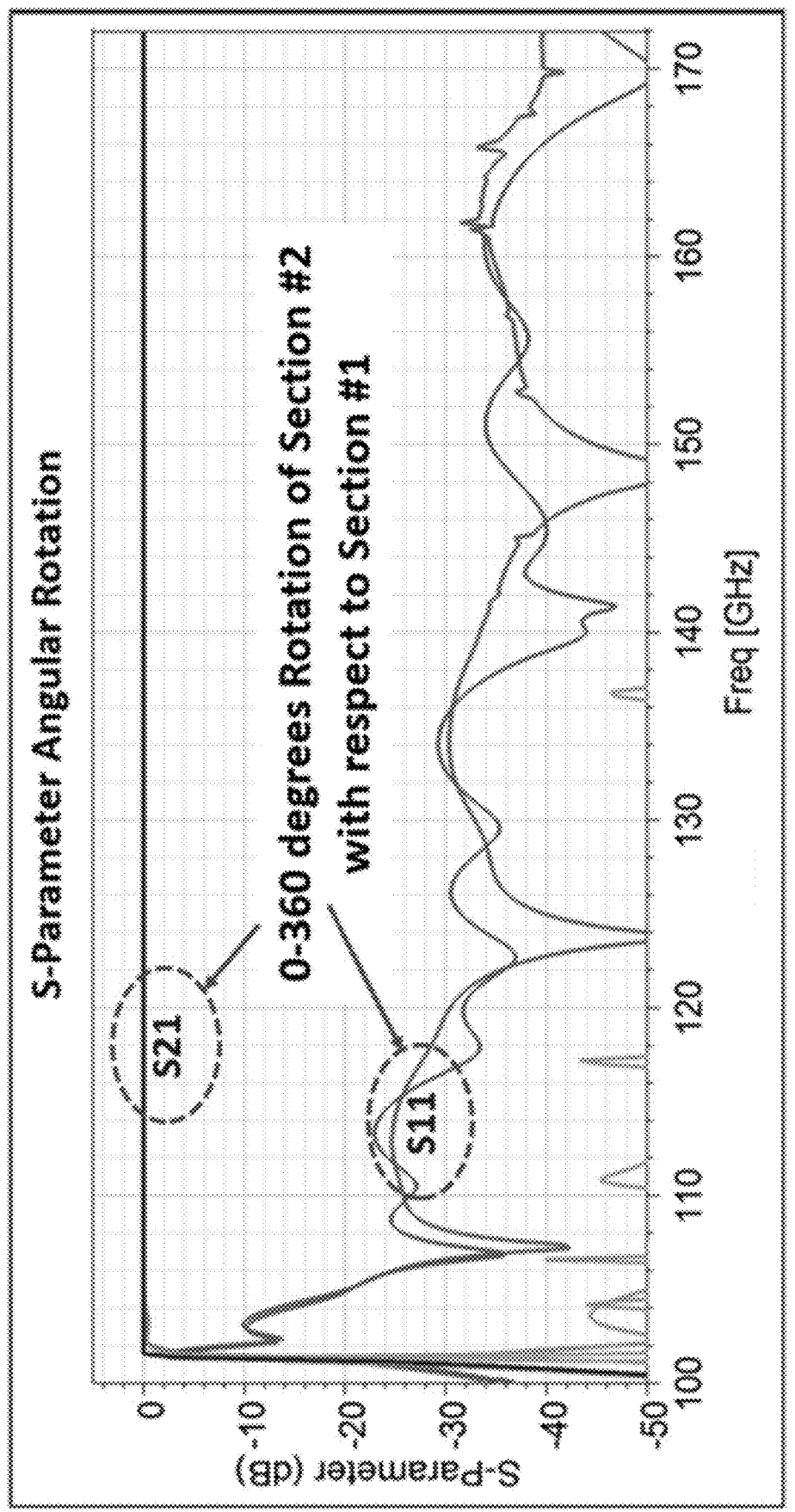
FIG. 5B illustrates the simulated performance of the ideal rotatable circular waveguide junction with TM01 mode excitation as shown in FIG. 5A, in accordance with the disclosure.

FIG. 5A illustrates the simulated excitation of an ideal rotatable circular waveguide junction with TM01 mode excitation, in accordance with the disclosure. The rotatable circular waveguide junction as shown in FIG. 5A represents a simulated TM01 mode excitation of two circular waveguide sections, with one being rotated with respect to the other. The graph in FIG. 5B represents the simulated performance of the ideal rotatable circular waveguide sections as shown in FIG. 5A in terms of S11 and S21 parameters. The mechanical designs of the rotatable junctions as shown in FIGS. 3A-3B and FIG. 4 are not included in this simulation. However, the simulation demonstrates that due to the symmetrical properties of the TM01 mode excitation in the circular waveguide sections, the rotation of one section with respect to the other does not significantly impact the performance of the S11 and S21 parameters.

Figure 6A:
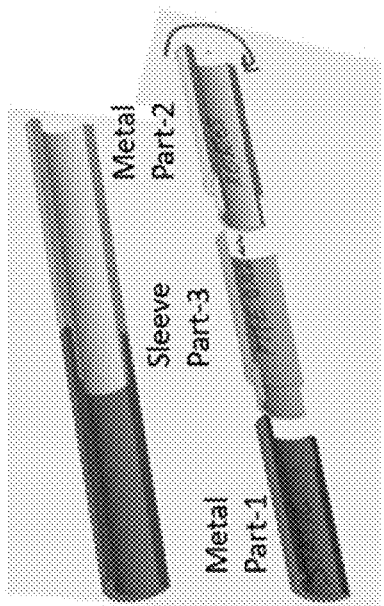
FIG. 6A illustrates the simulated TM01 mode excitation of a mechanical rotatable circular waveguide junction, in accordance with the disclosure.
Figure 6A:
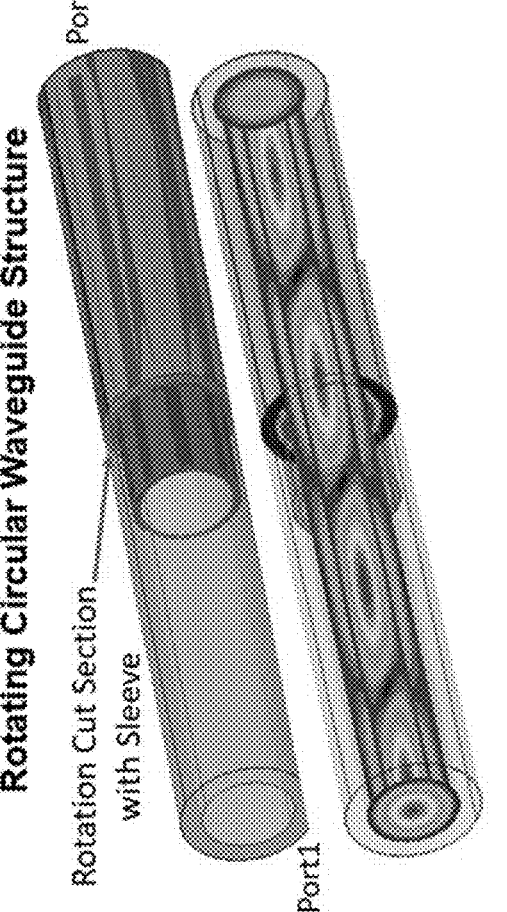
Figure 6B:
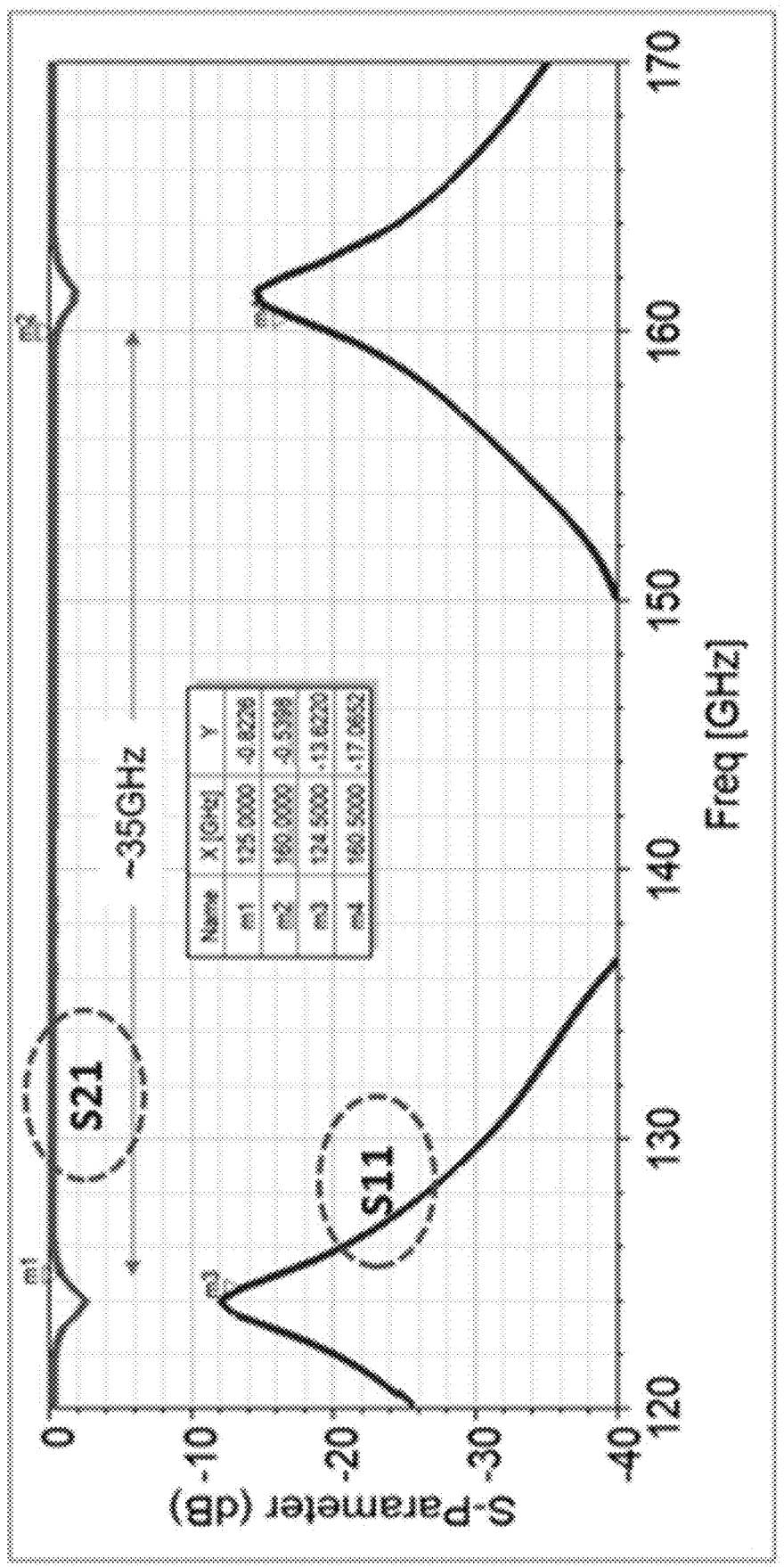
FIG. 6B illustrates the simulated performance of the mechanical rotatable circular waveguide junction with TM01 mode excitation as shown in FIG. 6B, in accordance with the disclosure.

FIG. 6A illustrates the simulated TM01 excitation of a mechanical rotatable circular waveguide junction, in accordance with the disclosure. The circular waveguide sections and coupled rotatable circular waveguide junction may be identified with those as shown in FIG. 4, with the performance being simulated using a TM01 mode excitation. The S-parameter plot as shown in FIG. 6B indicates that the sleeve 406 provides unobstructed rotation and uninterrupted transmission performance with circular TM01 modes. In other words, as was the case for the simulated ideal rotatable circular waveguide junction as shown in FIG. 5A, the use of the TM01 mode excitation advantageously enables a rotation of the circular waveguides without impacting the S-parameter performance.

Figure 7:
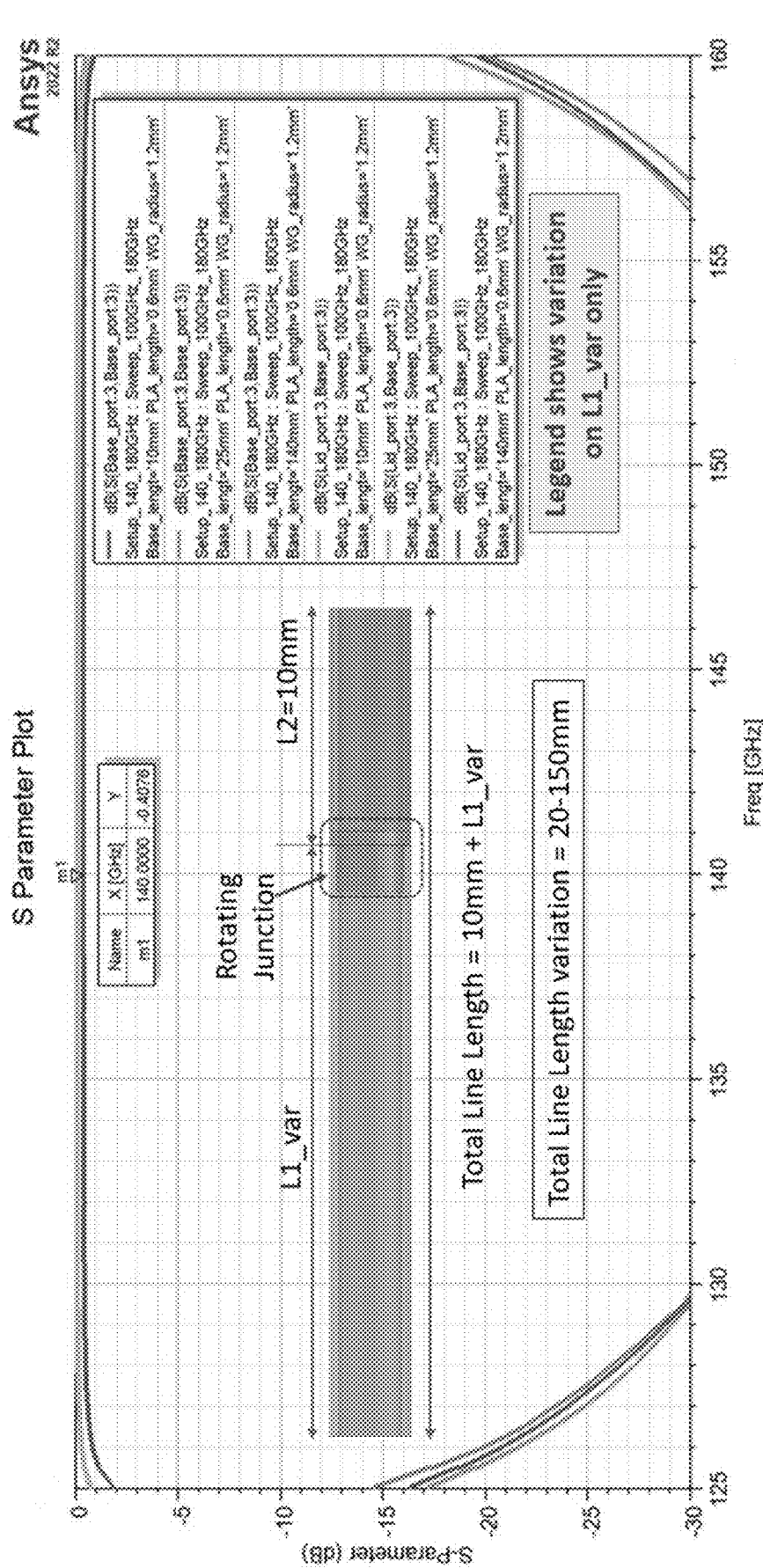
FIG. 7 illustrates the simulated performance for different lengths of a circular waveguide section coupled to a rotatable waveguide junction, in accordance with the disclosure.

FIG. 7 illustrates the simulated performance for different lengths of a circular waveguide section coupled to a rotatable waveguide junction, in accordance with the disclosure. The circular waveguide sections and coupled rotatable circular waveguide junction may be identified with those as shown in FIG. 4, with the performance being simulated using a TM01 mode excitation. The S-parameter plots as shown indicate that the length of one of the coupled circular waveguide sections may be varied to provide an overall length of ~20-150 mm without significantly impacting performance. Thus, this demonstrates that circular waveguide section length may be extended beyond the hinge structures as needed, as discussed above with respect to FIG. 2C. Again, the longer length of such circular waveguide sections may be integrated within the electronic device chassis portion and/or the display portion. As noted herein, the additionally length of the circular waveguide sections may advantageously be used to connect with an RFIC package transition, which may be co-located with the SoC package in the electronic device. Thus, with this approach, the RFIC package need not be located close to the hinge structure.

Figure 8:
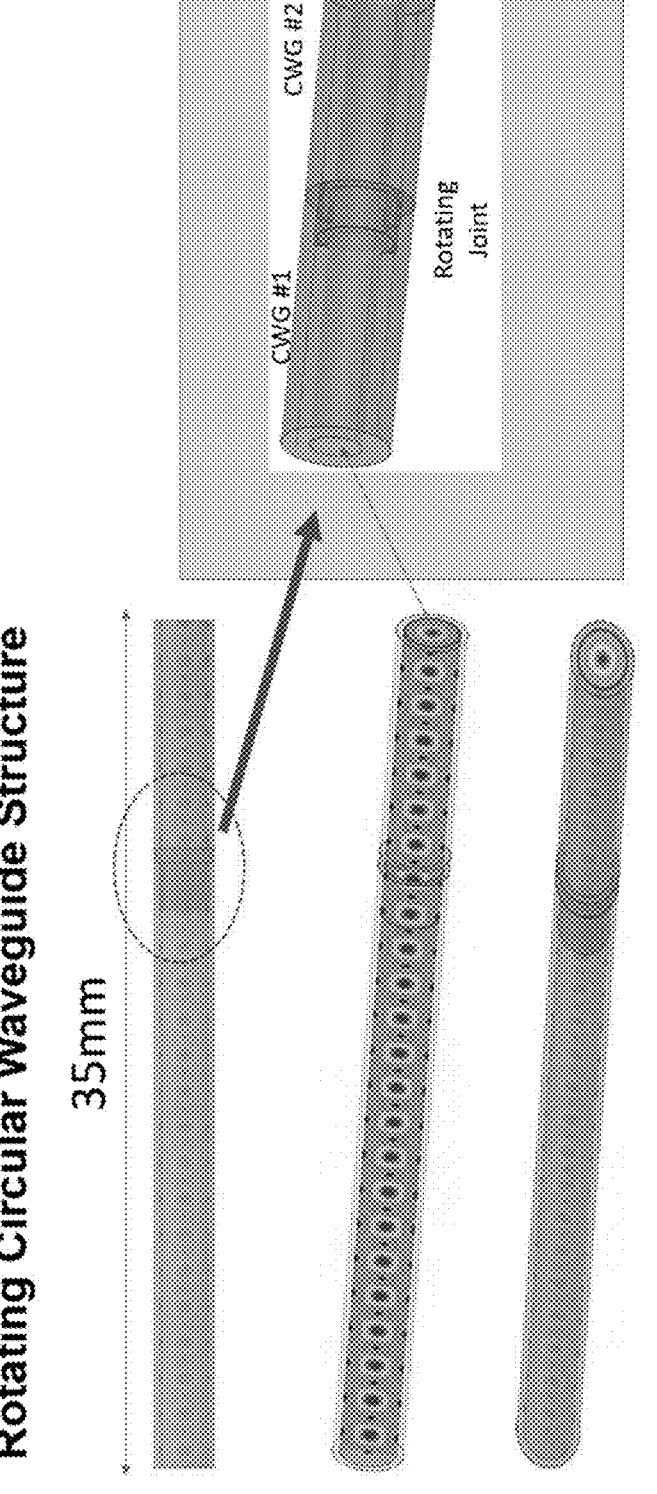
FIG. 8 illustrates an E-field plot through a rotatable waveguide junction, in accordance with the disclosure.

FIG. 8 illustrates an E-field plot through a rotatable waveguide junction, in accordance with the disclosure. The rotatable waveguide junction as shown in FIG. 8 is coupled to two circular waveguide sections, such as those shown in FIG. 4, and comprises an overall length of 35 mm. The 35-mm long rotating circular waveguide is shown in FIG. 8 with a simulated E-field plot using a TM01 mode excitation. As can be seen from FIG. 8, the TM01 mode remains uniform through the rotating circular waveguide joint structure, demonstrating the viability of the design.

RFIC to Circular Waveguide Transitions

Figure 9:
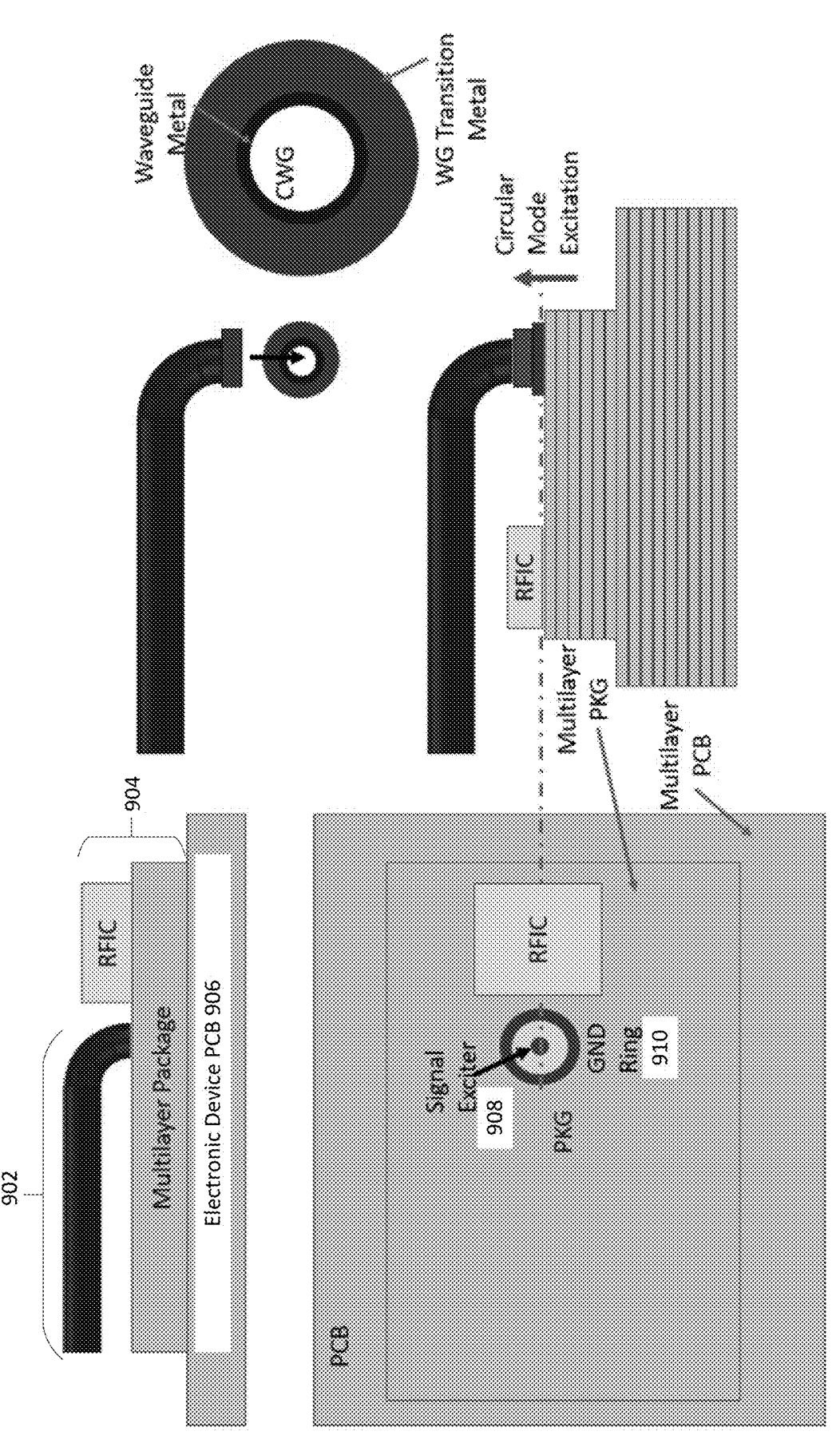
FIG. 9 illustrates a circular waveguide to RFIC top-package transition, in accordance with the disclosure.

FIG. 9 illustrates a circular waveguide to RFIC top-package transition, in accordance with the disclosure. For the RFIC top-package transition, the circular waveguide section is coupled to a respective RFIC package 904 via the top of the package. Such implementations may be advantageous to reduce the complexity of the top-package transition, although the required space (i.e. height) needed for such a transition is greater than the edge-coupled implementations as discussed further below with respect to FIG. 10. With continued reference to FIG. 9, the circular waveguide sections 902 may be identified with any of the circular waveguide sections of the rotatable circular waveguide structure 202 as discussed herein. Thus, the circular waveguide section 902 may be coupled to additional circular waveguide sections (not shown) that are routed through a hinge in the electronic device in which the RFIC package 904 is implemented, and may include one or more rotatable junctions as noted herein. Although FIG. 9 illustrates a single RFIC top-package transition, each end of the rotatable circular waveguide structure 202 (i.e. the circular waveguide section of each portion) may terminate via an RFIC top-package transition as described herein with respect to FIG. 9.

The RFIC package 904 may be identified with the RFIC package 204 and/or the RFIC package 206, as discussed herein with respect to FIGS. 2A-2C, in various non-limiting and illustrative scenarios. Additionally or alternatively, the RFIC package 904 may represent any suitable type of alternative component that may be coupled to the electronic device PCB 906. The electronic device PCB 906 may be implemented as any suitable PCB within the electronic device in which the rotatable circular waveguide structure 202 is implemented. The electronic device PCB 906 may comprise any suitable number and/or type of components configured to receive and/or transmit data signals using the rotatable circular waveguide structure 202 as discussed herein.

Thus, the electronic device PCB 906 may be identified with a portion of the electronic device to which data signals are transmitted and/or received to and/or from another portion of the electronic device. In a non-limiting and illustrative scenario, the electronic device PCB 906 may be identified with a PCB in the display portion of an electronic device, with a PCB in the chassis portion of the electronic device, etc. Although illustrated in FIG. 9 separately from the RFIC package 904, the electronic device PCB 906 may be integrated as part of the RFIC package 904. The electronic device PCB 906 may be identified with an SoC (or portion thereof) that is coupled to the RFIC package 904, such as the SoC 214 and/or the SoC 216, as discussed herein with respect to FIGS. 2A-2C.

The RFIC top-package transition includes a signal exciter 908 and ground ring 910, which may be integrated as part of the RFIC package 904 via conductive patterns, lines, traces, etc. The signal exciter 908 may be implemented as an EM coupler, and may comprise any suitable number and/or type of components configured to provide RF excitation and "launch" propagated electromagnetic signals into an end of the circular waveguide 902 for data signal transmissions. The signal exciter 908 is likewise configured to perform a reciprocal action by coupling propagated signals from the circular waveguide 902 to the RFIC package 904 when data signals are received.

The ground ring 910 may be implemented as any suitable number and/or type of components configured to be coupled with the outer and inner diameter structures of the circular waveguide 902. Thus, the ground ring 910 may be galvanically coupled to a terminating end of the circular waveguide 902. The signal exciter 908 and the ground ring 910 may have any suitable shape, connectors, steps, impedance matching components, etc., and may utilize any suitable techniques to function as a transition between the circular waveguide 902 and the RFIC package 904, including known techniques.

The signal exciter 908 and the ground ring 910 may be configured to excite any suitable number and/or type of circular waveguide modes, which are propagated via the circular waveguide 902. Although discussed herein with respect to the TM01 mode, this is a non-limiting and illustrative scenario, and the circular waveguide 902 may be configured to support electromagnetic wave propagation in accordance with any suitable number and/or type of waveguide modes depending upon the design of the RFIC top-package transition and/or the frequency of electromagnetic radiation that is to be propagated. However, the excitation and propagation of the TM01 circular waveguide mode may be particularly useful in light of the use of the rotatable junctions as discussed herein, as the TM01 circular waveguide mode provides axial symmetry.

Again, the electronic device PCB 906 may be coupled to (or form part of) the RFIC package 904, and be configured to receive data signals from the RFIC package 904 and/or to transmit data signals to the RFIC package 904. However, the circular waveguide 902 may be configured to propagate electromagnetic radiation that is higher in frequency than that of the electronic device PCB 906. Thus, the RFIC package 904 may be configured to perform upconversion and/or down-conversion of data signals depending upon the particular mode of operation. In a non-limiting and illustrative scenario, the RFIC package 904 may upconvert data signals received via the coupled electronic device PCB 906, which may be in the chassis portion of the electronic device. These data signals may be video signals or any other suitable type of data signals, including the HSIO data signals discussed above. Continuing this example, the RFIC package 904 may be configured to upconvert the data signals received by the electronic device PCB 906 to any suitable frequency in which the circular waveguide 902 is configured to propagate, which may be a function of the diameter of the circular waveguide 902. In various illustrative and non-limiting scenarios, the RFIC package 904 may be configured to upconvert the data signals to a frequency of 100 GHZ, 140 GHZ, 160 GHZ, etc., which are transmitted to another portion of the electronic device (such as the display portion) by propagation via the circular waveguide 902 as upconverted data signals (such as upconverted video signals). These data signals are then received and downconverted via the RFIC package at the other portion of the electronic device as discussed herein.

Thus, the RFIC package 904 may additionally or alternatively be configured to downconvert the data signals received via the circular waveguide 902 from any suitable frequency in which the circular waveguide 902 is configured to propagate, and to provide the downconverted data signals to the coupled electronic device PCB 906. Thus, in various illustrative and non-limiting scenarios, the RFIC package 904 may additionally or alternatively be configured to downconvert received data signals (such as upconverted video signals) that have been transmitted via an RFIC package from another portion of the electronic device by propagation via the circular waveguide 902.

Figure 10:
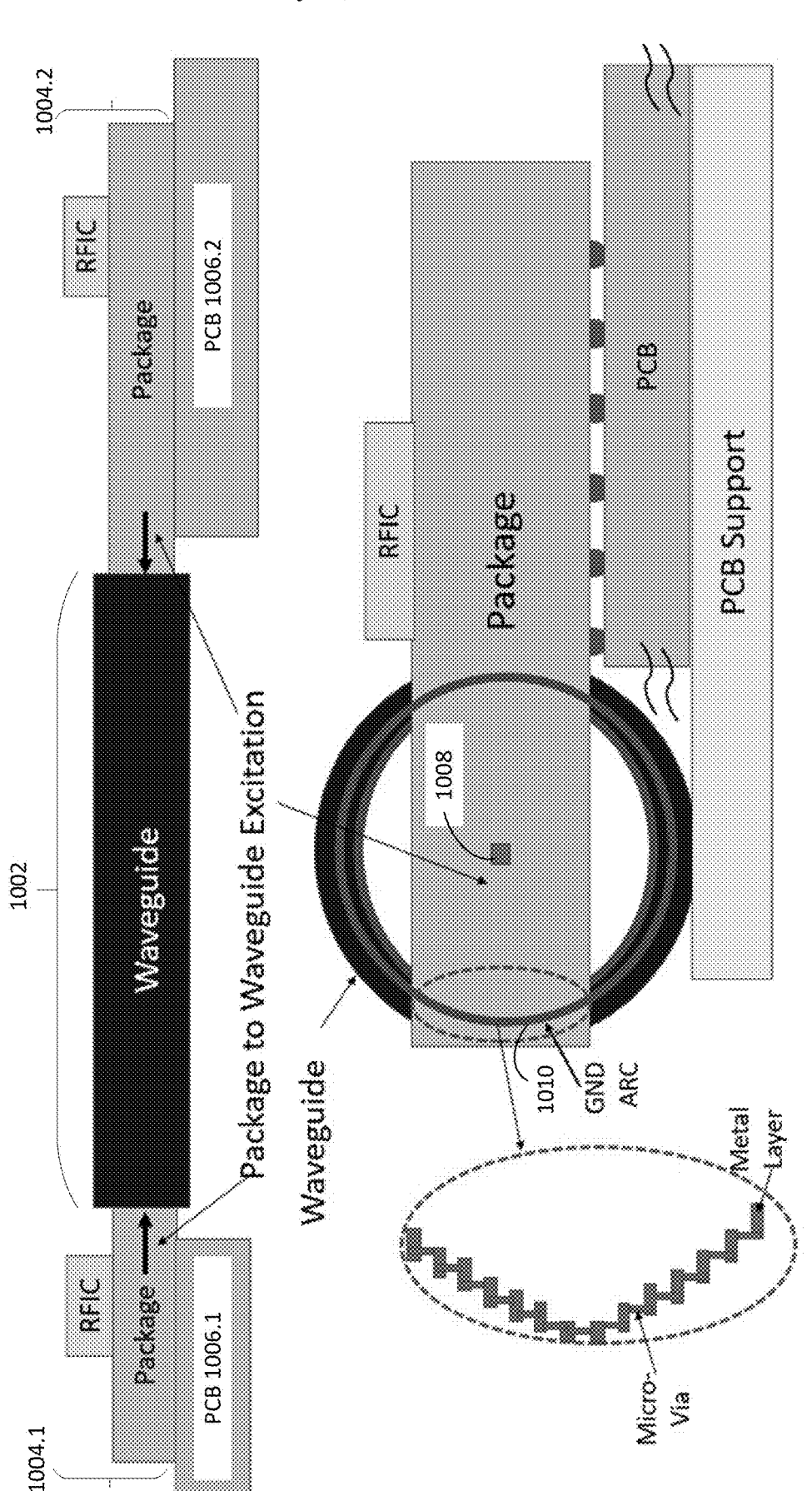
FIG. 10 illustrates a circular waveguide to RFIC edge-package transition, in accordance with the disclosure.

FIG. 10 illustrates a circular waveguide to RFIC edge-package transition, in accordance with the disclosure. The circular waveguide to RFIC edge-package transition also comprises a circular waveguide 1002, RFIC packages 1004.1, 1004.2, and electronic PCBs 1006.1, 1006.2. The RFIC package 1004.1 and PCB 1006.1 may be identified with one portion of the electronic device (such as the chassis portion), whereas the RFIC package 1004.2 and PCB 1006.2 may be identified with another portion of the electronic device (such as the display portion), as discussed herein. Thus, the circular waveguide 1002 may be identified with the rotatable circular waveguide structure 202 as discussed herein, with each terminating end of the circular waveguide being shown in FIG. 10 for clarity. Each of the RFIC packages 1004.1, 1004.2 may operate in a similar or identical manner as the RFIC package 904 as discussed above with respect to FIG. 9. Moreover, each of the PCBs 1006.1, 1006.2 may operate in a similar or identical manner as the PCB 906 as discussed above with respect to FIG. 9, and may be identified with an SoC (or portion thereof) that is coupled to each respective RFIC package 1004.1, 1004.2, such as the SoC 214 and/or the SoC 216. Therefore, only differences between these components are further discussed below for purposes of brevity.

For the RFIC edge-package transition as shown in FIG. 10, the ends of each circular waveguide section 1002 are coupled to a respective RFIC package 1004.1, 1004.2 via the edge of the RFIC package. Such implementations may be advantageous to decrease the space (i.e. height) needed for the transition. With continued reference to FIG. 10, the RFIC edge-package transition comprises a signal exciter 1008, which may be configured to operate in a similar manner as the signal exciter 908 as discussed above with respect to FIG. 9, to enable mode excitation in the circular waveguide 1002. The signal exciter 1008 may be formed via any suitable number and/or type of conductive elements. However, in contrast with the RFIC top-package transition as shown in FIG. 9, the signal exciter 1008 is formed on an edge of the RFIC packages 1004.1, 1004.2. Moreover, the RFIC edge-package transition as shown in FIG. 10 comprises a ground arc 1010 that is also formed on an edge of the RFIC packages 1004.1, 1004.2 via any suitable number and/or type of conductive elements. The signal exciter 1008 and ground arc 1010 may have any suitable shape, connectors, steps, impedance matching components, etc., and may utilize any suitable techniques to function as a transition between the circular waveguide 1002 and the RFIC packages 1004.1, 1004.2, including known techniques.

The ground arc 1010 may be (at least partially) galvanically coupled to a terminating end of the circular waveguide 1002. That is, the ground arc 1010 may be coupled with the outer and inner diameter structures of the circular waveguide 1002 via any suitable connection. Although shown in FIG. 10 as being coupled with a portion of the end of the circular waveguide 1002, this is a non-limiting and illustrative scenario. The ground arc 1010 may be implemented as a full ground ring, i.e. have a radius less than half the thickness of the RFIC packages 1006.1, 1006.2. This may be the case for scenarios in which the circular waveguide 1002 has a smaller diameter than the thickness of the RFIC packages 1006.1, 1006.2. As shown in FIG. 10, the ground arc 1010 may be formed at the edge of the RFIC package 1004.1, 1004.2 by any suitable number of vias that interconnect metal layers in a substrate package of the RFIC package 1004.1, 1004.2.

Although the RFIC top-package transition and the RFIC edge-package transition are discussed in FIGS. 9 and 10 with respect to their use for each of the RFIC packages in the electronic device, this is a non-limiting and illustrative scenario. In other scenarios, the use of the RFIC top-package transition and the RFIC edge-package transition may be combined within a single electronic device design. For instance, the chassis portion may utilize a RFIC top-package transition given the additional thickness available, whereas height restraints in the display portion may require the use of the RFIC edge-package transition.

An Electronic Device

Figure 11:
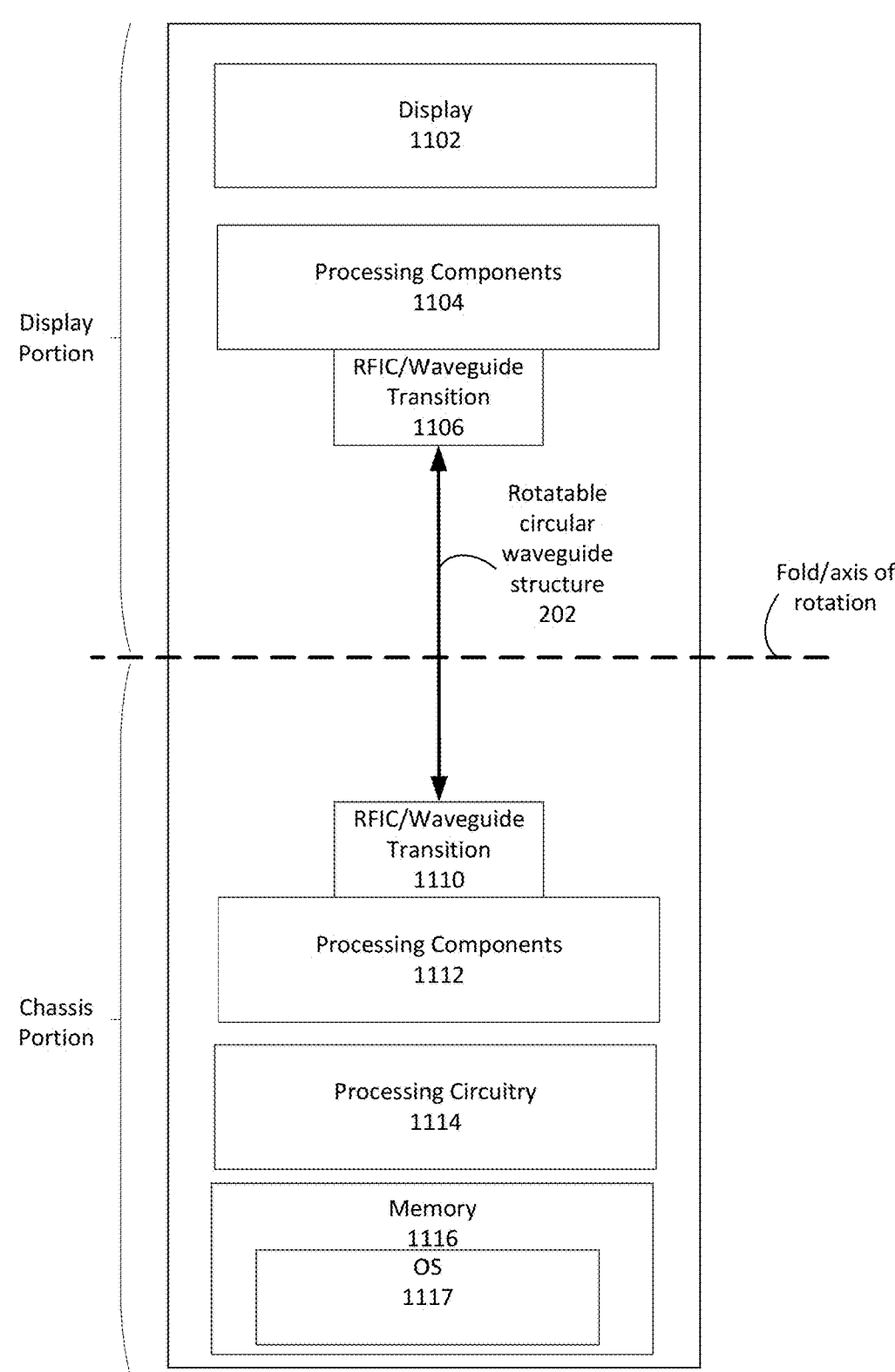
FIG. 11 illustrates an electronic device, in accordance with the present disclosure.

FIG. 11 illustrates an electronic device, in accordance with the present disclosure. The electronic device 1100 may be identified with any suitable type of device that implements the rotatable circular waveguide structure 202 as discussed herein to enable the transfer of data signals between two different portions of the electronic device. The electronic device 1100 may be identified with any suitable device having at least two different portions that are at least partially rotatable with respect to one another. Thus, the electronic device 1100 may be identified with a wireless device, a user equipment (UE), a mobile phone, a laptop computer, a tablet, a wearable device, etc. In one scenario, the electronic device 1100 may be identified with the laptop 102 as discussed with respect to FIGS. 1A-1G.

The electronic device 1100 may comprise different portions that may be rotated with respect to one another. As shown in FIG. 11, this may include a display portion and a chassis portion, as discussed above. The display portion may comprise a display 1102, which may be identified with any suitable type of display. The display portion may also comprise processing components 1104 and a RFIC/waveguide transition 1106. The processing components may be identified, in a non-limiting and illustrative scenario, with an SoC, such as the SoC 214 as discussed herein with respect to FIGS. 2A-2C. The RFIC/waveguide transition 1106 may be identified with an RFIC package and waveguide transition, such as those discussed above with respect to FIGS. 9 and 10, in a non-limiting and illustrative scenario.

The chassis portion may also comprise processing components 1112 and a RFIC/waveguide transition 1110. The processing components may also be identified, in a non-limiting and illustrative scenario, with an SoC, such as the SoC 216 as discussed herein with respect to FIGS. 2A-2C. The RFIC/waveguide transition 1110 may also be identified with an RFIC package and waveguide transition, such as those discussed above with respect to FIGS. 9 and 10, in a non-limiting and illustrative scenario.

As shown in FIG. 11, the rotatable circular waveguide structure 202 as discussed herein may couple the display portion and the chassis portion of the electronic device to one another via the respectively coupled RFIC/waveguide transitions 1106, 1110. Again, the rotatable circular waveguide structure 202 may enable the communication of data signals between the display and chassis portions of the electronics device, and may include one or more circular waveguide sections that are routed through a hinge of the electronic device 1100. The rotatable circular waveguide structure 202 may include one or more rotatable junctions to enable rotation of sections of the circular waveguide rotatable circular waveguide structure 202 with respect to one another as the chassis portion and the display portion are also rotated with respect to one another, as noted herein. The rotatable circular waveguide structure 202 may facilitate data communications between the chassis and display portions during rotation of these components with respect to one another, as noted above.

The electronics device 1100 may comprise processing circuitry 1114, which may be configured as any suitable number and/or type of computer processors, and which may function to control the electronic device 1100 and/or other components of the electronic device 1100. The processing circuitry 1114 may be identified with one or more processors (or suitable portions thereof) implemented by the electronic device 1100. The processing circuitry 1102 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 1114 may be configured to carry out instructions to perform arithmetical, logical, and/or input/output (I/O) operations, and/or to control the operation of one or more components of electronic device 1100 to perform various functions as described herein. The processing circuitry 1114 may include one or more microprocessor cores, memory registers, buffers, clocks, etc., and may generate electronic control signals associated with the components of the device 1100 to control and/or modify the operation of these components. The processing circuitry 1114 may communicate with and/or control functions associated with the memory 1116, as well as any other components of the electronic device 1100.

The memory 1116 stores data and/or instructions such that, when executed by the processing circuitry 114, cause the electronic device 1100 to perform various functions such as controlling, monitoring, and/or regulating the operation of the electronic device 1100, providing data to be transmitted and/or received via the rotatable circular waveguide structure 202, and/or processing signals that are received via the rotatable circular waveguide structure 202 as discussed herein. The memory 1116 may be implemented as any suitable type of volatile and/or non-volatile memory, including read-only memory (ROM), random access memory (RAM), flash memory, a magnetic storage media, an optical disc, erasable programmable read only memory (EPROM), programmable read only memory (PROM), etc. The memory 1116 may be non-removable, removable, or a combination of both. The memory 1116 may be implemented as a non-transitory computer readable medium storing one or more executable instructions such as, for example, logic, algorithms, code, etc. As further discussed below, the instructions, logic, code, etc., stored in the memory 1116 are represented by the (operating system) OS module 1117 as shown, which may enable the functionality disclosed herein to be functionally realized.

General Configuration of a Rotatable Circular Waveguide Structure

A rotatable circular waveguide structure is provided. The rotatable circular waveguide structure comprises a first circular waveguide coupled to a display portion of an electronic device, and a second circular waveguide coupled to a chassis portion of the electronic device. The first circular waveguide and the second circular waveguide are coupled to one another via a coupling section that is routed through a hinge of the electronic device, and the first circular waveguide, the second circular waveguide, and the coupling section are configured to enable a propagation of data signals between the chassis portion and the display portion of the electronic device. In addition or in alternative to and in any combination with the optional features previously explained in this paragraph, the coupling section is coupled to the first circular waveguide at a first rotatable junction that enables a rotation of a section of the first circular waveguide and the coupling section with respect to one another as the chassis portion and the display portion are rotated with respect to one another. In addition or in alternative to and in any combination with the optional features previously explained in this paragraph, the coupling section is coupled to the second circular waveguide at a second rotatable junction, and the second rotatable junction is configured to enable a rotation of a section of the second circular waveguide and the coupling section with respect to one another as the chassis portion and the display portion are rotated with respect to one another. In addition or in alternative to and in any combination with the optional features previously explained in this paragraph, the first circular waveguide is coupled to a first radio frequency integrated circuit (RFIC) in the display portion of the electronic device via a first waveguide to RFIC transition, and the second circular waveguide is coupled to a second RFIC in the chassis portion of the electronic device via a second waveguide to RFIC transition. In addition or in alternative to and in any combination with the optional features previously explained in this paragraph, the first waveguide to RFIC transition and the second waveguide to RFIC transition comprise an edge-coupled waveguide to RFIC transition. In addition or in alternative to and in any combination with the optional features previously explained in this paragraph, the first waveguide to RFIC transition and the second waveguide to RFIC transition each comprises a respective signal exciter configured to perform excitation of a TM01 mode in the first circular waveguide and the second circular waveguide, respectively. In addition or in alternative to and in any combination with the optional features previously explained in this paragraph, the edge-coupled waveguide to RFIC transition of the first waveguide to RFIC transition and the edge-coupled waveguide to RFIC transition of the second waveguide to RFIC transition comprise a ground arc configured to be galvanically coupled to the first circular waveguide and the second circular waveguide, respectively, and the ground arc is formed by a plurality of vias interconnecting metal layers in a substrate package. In addition or in alternative to and in any combination with the optional features previously explained in this paragraph, the second RFIC in the chassis portion is configured to perform upconversion to generate the data signals that are transmitted to the first RFIC in the display portion via propagation though the first circular waveguide, the second circular waveguide, and the coupling section in accordance with a TM01 excitation mode, and the first RFIC is configured to downconvert the data signals. In addition or in alternative to and in any combination with the optional features previously explained in this paragraph, the first rotatable junction is formed via a mated coupling between the first circular waveguide and the coupling section, and the mated coupling comprises a non-conductive sleeve that is coupled between the first circular waveguide and the coupling section while maintaining a galvanic coupling between the first circular waveguide and the coupling section. In addition or in alternative to and in any combination with the optional features previously explained in this paragraph, the first rotatable junction is formed via a mated coupling between the first circular waveguide and the coupling section, and the mated coupling comprises a non-conductive sleeve that is formed over a portion of the first circular waveguide or a portion of the coupling section while maintaining a galvanic coupling between the first circular waveguide and the coupling section.

General Configuration of an Electronic Device

An electronic device is provided. The electronic device comprises a chassis portion and a display portion. The chassis portion and the display portion are configured to be rotatable with respect to one another. The electronic device also comprises a first circular waveguide coupled to the chassis portion, a second circular waveguide coupled to the display portion, and a coupling section that is routed through a hinge of the electronic device. The first circular waveguide, the second circular waveguide, and the coupling section are configured to enable a propagation of data signals between the chassis portion and the display portion of the electronic device. In addition or in alternative to and in any combination with the optional features previously explained in this paragraph, the first circular waveguide and the second circular waveguide are coupled to one another via the coupling section, the coupling section being coupled to the first circular waveguide at a first rotatable junction that enables a rotation of a section of the first circular waveguide and the coupling section with respect to one another as the chassis portion and the display portion are rotated with respect to one another. In addition or in alternative to and in any combination with the optional features previously explained in this paragraph, the coupling section is coupled to the second circular waveguide at a second rotatable junction, and the second rotatable junction is configured to enable a rotation of a section of the second circular waveguide and the coupling section with respect to one another as the chassis portion and the display portion are rotated with respect to one another. In addition or in alternative to and in any combination with the optional features previously explained in this paragraph, the electronic device further comprises a first radio frequency integrated circuit (RFIC) in the display portion coupled to the first circular waveguide via a first waveguide to RFIC transition, and a second RFIC in the chassis portion coupled to the second circular waveguide via a second waveguide to RFIC transition. In addition or in alternative to and in any combination with the optional features previously explained in this paragraph, the first waveguide to RFIC transition and the second waveguide to RFIC transition comprise an edge-coupled waveguide to RFIC transition. In addition or in alternative to and in any combination with the optional features previously explained in this paragraph, the first waveguide to RFIC transition and the second waveguide to RFIC transition each comprises a respective signal exciter configured to perform excitation of a TM01 mode in the first circular waveguide and the second circular waveguide, respectively. In addition or in alternative to and in any combination with the optional features previously explained in this paragraph, the edge-coupled waveguide to RFIC transition of the first waveguide to RFIC transition and the edge-coupled waveguide to RFIC transition of the second waveguide to RFIC transition comprise a ground arc configured to be galvanically coupled to the first circular waveguide and the second circular waveguide, respectively, and the ground arc is formed by a plurality of vias interconnecting metal layers in a substrate package. In addition or in alternative to and in any combination with the optional features previously explained in this paragraph, the second RFIC in the chassis portion is configured to perform upconversion to generate the data signals that are transmitted to the first RFIC in the display portion via propagation though the first circular waveguide, the second circular waveguide, and the coupling section in accordance with a TM01 excitation mode, and the first RFIC is configured to downconvert the data signals. In addition or in alternative to and in any combination with the optional features previously explained in this paragraph, the first rotatable junction is formed via a mated coupling between the first circular waveguide and the coupling section, and the mated coupling comprises a non-conductive sleeve that is coupled between the first circular waveguide and the coupling section while maintaining a galvanic coupling between the first circular waveguide and the coupling section. In addition or in alternative to and in any combination with the optional features previously explained in this paragraph, the first rotatable junction is formed via a mated coupling between the first circular waveguide and the coupling section, and the mated coupling comprises a non-conductive sleeve that is formed over a portion of the first circular waveguide or a portion of the coupling section while maintaining a galvanic coupling between the first circular waveguide and the coupling section.

EXAMPLES

The following examples pertain to various techniques of the present disclosure.

An example (e.g. example 1) is directed to a rotatable circular waveguide structure, comprising: a first circular waveguide coupled to a display portion of an electronic device; and a second circular waveguide coupled to a chassis portion of the electronic device, wherein the first circular waveguide and the second circular waveguide are coupled to one another via a coupling section that is routed through a hinge of the electronic device, and wherein the first circular waveguide, the second circular waveguide, and the coupling section are configured to enable a propagation of data signals between the chassis portion and the display portion of the electronic device.

Another example (e.g. example 2) relates to a previously-described example (e.g. example 1), wherein the coupling section is coupled to the first circular waveguide at a first rotatable junction that enables a rotation of a section of the first circular waveguide and the coupling section with respect to one another as the chassis portion and the display portion are rotated with respect to one another.

Another example (e.g. example 3) relates to a previously-described example (e.g. one or more of examples 1-2), wherein the coupling section is coupled to the second circular waveguide at a second rotatable junction, and wherein the second rotatable junction is configured to enable a rotation of a section of the second circular waveguide and the coupling section with respect to one another as the chassis portion and the display portion are rotated with respect to one another.

Another example (e.g. example 4) relates to a previously-described example (e.g. one or more of examples 1-3), wherein the first circular waveguide is coupled to a first radio frequency integrated circuit (RFIC) in the display portion of the electronic device via a first waveguide to RFIC transition, and wherein the second circular waveguide is coupled to a second RFIC in the chassis portion of the electronic device via a second waveguide to RFIC transition.

Another example (e.g. example 5) relates to a previously-described example (e.g. one or more of examples 1-4), wherein the first waveguide to RFIC transition and the second waveguide to RFIC transition comprise an edge-coupled waveguide to RFIC transition.

Another example (e.g. example 6) relates to a previously-described example (e.g. one or more of examples 1-5), wherein the first waveguide to RFIC transition and the second waveguide to RFIC transition each comprises a respective signal exciter configured to perform excitation of a TM01 mode in the first circular waveguide and the second circular waveguide, respectively.

Another example (e.g. example 7) relates to a previously-described example (e.g. one or more of examples 1-6), wherein the edge-coupled waveguide to RFIC transition of the first waveguide to RFIC transition and the edge-coupled waveguide to RFIC transition of the second waveguide to RFIC transition comprise a ground arc configured to be galvanically coupled to the first circular waveguide and the second circular waveguide, respectively, and wherein the ground arc is formed by a plurality of vias interconnecting metal layers in a substrate package.

Another example (e.g. example 8) relates to a previously-described example (e.g. one or more of examples 1-7), wherein the second RFIC in the chassis portion is configured to perform upconversion to generate the data signals that are transmitted to the first RFIC in the display portion via propagation though the first circular waveguide, the second circular waveguide, and the coupling section in accordance with a TM01 excitation mode, and wherein the first RFIC is configured to downconvert the data signals.

Another example (e.g. example 9) relates to a previously-described example (e.g. one or more of examples 1-8), wherein the first rotatable junction is formed via a mated coupling between the first circular waveguide and the coupling section, and wherein the mated coupling comprises a non-conductive sleeve that is coupled between the first circular waveguide and the coupling section while maintaining a galvanic coupling between the first circular waveguide and the coupling section.

Another example (e.g. example 10) relates to a previously-described example (e.g. one or more of examples 1-9), wherein the first rotatable junction is formed via a mated coupling between the first circular waveguide and the coupling section, and wherein the mated coupling comprises a non-conductive sleeve that is formed over a portion of the first circular waveguide or a portion of the coupling section while maintaining a galvanic coupling between the first circular waveguide and the coupling section.

An example (e.g. example 11) is directed to an electronic device, comprising: a chassis portion; a display portion, the chassis portion and the display portion being configured to be rotatable with respect to one another, a first circular waveguide coupled to the chassis portion; a second circular waveguide coupled to the display portion; and a coupling section that is routed through a hinge of the electronic device, wherein the first circular waveguide, the second circular waveguide, and the coupling section are configured to enable a propagation of data signals between the chassis portion and the display portion of the electronic device.

Another example (e.g. example 12) relates to a previously-described example (e.g. example 11), wherein the first circular waveguide and the second circular waveguide are coupled to one another via the coupling section, the coupling section being coupled to the first circular waveguide at a first rotatable junction that enables a rotation of a section of the first circular waveguide and the coupling section with respect to one another as the chassis portion and the display portion are rotated with respect to one another.

Another example (e.g. example 13) relates to a previously-described example (e.g. one or more of examples 11-12), wherein the coupling section is coupled to the second circular waveguide at a second rotatable junction, and wherein the second rotatable junction is configured to enable a rotation of a section of the second circular waveguide and the coupling section with respect to one another as the chassis portion and the display portion are rotated with respect to one another.

Another example (e.g. example 14) relates to a previously-described example (e.g. one or more of examples 11-13), further comprising: a first radio frequency integrated circuit (RFIC) in the display portion coupled to the first circular waveguide via a first waveguide to RFIC transition, and a second RFIC in the chassis portion coupled to the second circular waveguide via a second waveguide to RFIC transition.

Another example (e.g. example 15) relates to a previously-described example (e.g. one or more of examples 11-14), wherein the first waveguide to RFIC transition and the second waveguide to RFIC transition comprise an edge-coupled waveguide to RFIC transition.

Another example (e.g. example 16) relates to a previously-described example (e.g. one or more of examples 11-15), wherein the first waveguide to RFIC transition and the second waveguide to RFIC transition each comprises a respective signal exciter configured to perform excitation of a TM01 mode in the first circular waveguide and the second circular waveguide, respectively.

Another example (e.g. example 17) relates to a previously-described example (e.g. one or more of examples 11-16), wherein the edge-coupled waveguide to RFIC transition of the first waveguide to RFIC transition and the edge-coupled waveguide to RFIC transition of the second waveguide to RFIC transition comprise a ground arc configured to be galvanically coupled to the first circular waveguide and the second circular waveguide, respectively, and wherein the ground arc is formed by a plurality of vias interconnecting metal layers in a substrate package.

Another example (e.g. example 18) relates to a previously-described example (e.g. one or more of examples 11-17), wherein the second RFIC in the chassis portion is configured to perform upconversion to generate the data signals that are transmitted to the first RFIC in the display portion via propagation though the first circular waveguide, the second circular waveguide, and the coupling section in accordance with a TM01 excitation mode, and wherein the first RFIC is configured to downconvert the data signals.

Another example (e.g. example 19) relates to a previously-described example (e.g. one or more of examples 11-18), wherein the first rotatable junction is formed via a mated coupling between the first circular waveguide and the coupling section, and wherein the mated coupling comprises a non-conductive sleeve that is coupled between the first circular waveguide and the coupling section while maintaining a galvanic coupling between the first circular waveguide and the coupling section.

Another example (e.g. example 20) relates to a previously-described example (e.g. one or more of examples 11-19), wherein the first rotatable junction is formed via a mated coupling between the first circular waveguide and the coupling section, and wherein the mated coupling comprises a non-conductive sleeve that is formed over a portion of the first circular waveguide or a portion of the coupling section while maintaining a galvanic coupling between the first circular waveguide and the coupling section.

An example (e.g. example 21) is directed to a rotatable circular waveguide structure, comprising: a first circular waveguide coupled to a display means of an electronic device; and a second circular waveguide coupled to a chassis means of the electronic device, wherein the first circular waveguide and the second circular waveguide are coupled to one another via a coupling section that is routed through a hinge of the electronic device, and wherein the first circular waveguide, the second circular waveguide, and the coupling section are configured to enable a propagation of data signals between the chassis means and the display means of the electronic device.

Another example (e.g. example 22) relates to a previously-described example (e.g. example 21), wherein the coupling section is coupled to the first circular waveguide at a first rotatable means that enables a rotation of a section of the first circular waveguide and the coupling section with respect to one another as the chassis means and the display means are rotated with respect to one another.

Another example (e.g. example 23) relates to a previously-described example (e.g. one or more of examples 21-22), wherein the coupling section is coupled to the second circular waveguide at a second rotatable means, and wherein the second rotatable means is configured to enable a rotation of a section of the second circular waveguide and the coupling section with respect to one another as the chassis means and the display means are rotated with respect to one another.

Another example (e.g. example 24) relates to a previously-described example (e.g. one or more of examples 21-23), wherein the first circular waveguide is coupled to a first radio frequency integrated circuit (RFIC) means in the display means of the electronic device via a first waveguide to RFIC transition means, and wherein the second circular waveguide is coupled to a second RFIC means in the chassis means of the electronic device via a second waveguide to RFIC transition means.

Another example (e.g. example 25) relates to a previously-described example (e.g. one or more of examples 21-24), wherein the first waveguide to RFIC transition means and the second waveguide to RFIC transition means comprise an edge-coupled waveguide to RFIC transition.

Another example (e.g. example 26) relates to a previously-described example (e.g. one or more of examples 21-25), wherein the first waveguide to RFIC transition means and the second waveguide to RFIC transition means each comprises a respective signal exciter means configured to perform excitation of a TM01 mode in the first circular waveguide and the second circular waveguide, respectively.

Another example (e.g. example 27) relates to a previously-described example (e.g. one or more of examples 21-26), wherein the edge-coupled waveguide to RFIC transition of the first waveguide to RFIC transition means and the edge-coupled waveguide to RFIC transition of the second waveguide to RFIC transition means comprise a ground arc configured to be galvanically coupled to the first circular waveguide and the second circular waveguide, respectively, and wherein the ground arc is formed by a plurality of vias interconnecting metal layers in a substrate means.

Another example (e.g. example 28) relates to a previously-described example (e.g. one or more of examples 21-27), wherein the second RFIC means in the chassis means is configured to perform upconversion to generate the data signals that are transmitted to the first RFIC means in the display means via propagation though the first circular waveguide, the second circular waveguide, and the coupling section in accordance with a TM01 excitation mode, and wherein the first RFIC means is configured to downconvert the data signals.

Another example (e.g. example 29) relates to a previously-described example (e.g. one or more of examples 21-28), wherein the first rotatable means is formed via a mated coupling between the first circular waveguide and the coupling section, and wherein the mated coupling comprises a non-conductive sleeve that is coupled between the first circular waveguide and the coupling section while maintaining a galvanic coupling between the first circular waveguide and the coupling section.

Another example (e.g. example 30) relates to a previously-described example (e.g. one or more of examples 21-29), wherein the first rotatable means is formed via a mated coupling between the first circular waveguide and the coupling section, and wherein the mated coupling comprises a non-conductive sleeve that is formed over a portion of the first circular waveguide or a portion of the coupling section while maintaining a galvanic coupling between the first circular waveguide and the coupling section.

An example (e.g. example 31) is directed to an electronic device, comprising: a chassis means; a display means, the chassis portion and the display portion being configured to be rotatable with respect to one another, a first circular waveguide coupled to the chassis means; a second circular waveguide coupled to the display means; and a coupling section that is routed through a hinge of the electronic device, wherein the first circular waveguide, the second circular waveguide, and the coupling section are configured to enable a propagation of data signals between the chassis means and the display means of the electronic device.

Another example (e.g. example 32) relates to a previously-described example (e.g. example 31), wherein the first circular waveguide and the second circular waveguide are coupled to one another via the coupling section, the coupling section being coupled to the first circular waveguide at a first rotatable means that enables a rotation of a section of the first circular waveguide and the coupling section with respect to one another as the chassis means and the display means are rotated with respect to one another.

Another example (e.g. example 33) relates to a previously-described example (e.g. one or more of examples 31-32), wherein the coupling section is coupled to the second circular waveguide at a second rotatable means, and wherein the second rotatable means is configured to enable a rotation of a section of the second circular waveguide and the coupling section with respect to one another as the chassis means and the display means are rotated with respect to one another.

Another example (e.g. example 34) relates to a previously-described example (e.g. one or more of examples 31-33), further comprising: a first radio frequency integrated circuit (RFIC) means in the display means coupled to the first circular waveguide via a first waveguide to RFIC transition means, and a second RFIC means in the chassis means coupled to the second circular waveguide via a second waveguide to RFIC transition means.

Another example (e.g. example 35) relates to a previously-described example (e.g. one or more of examples 31-34), wherein the first waveguide to RFIC transition means and the second waveguide to RFIC transition means comprise an edge-coupled waveguide to RFIC transition.

Another example (e.g. example 36) relates to a previously-described example (e.g. one or more of examples 31-35), wherein the first waveguide to RFIC transition means and the second waveguide to RFIC transition means each comprises a respective signal exciter means configured to perform excitation of a TM01 mode in the first circular waveguide and the second circular waveguide, respectively.

Another example (e.g. example 37) relates to a previously-described example (e.g. one or more of examples 31-36), wherein the edge-coupled waveguide to RFIC transition of the first waveguide to RFIC transition means and the edge-coupled waveguide to RFIC transition of the second waveguide to RFIC transition means comprise a ground arc configured to be galvanically coupled to the first circular waveguide and the second circular waveguide, respectively, and wherein the ground arc is formed by a plurality of vias interconnecting metal layers in a substrate means.

Another example (e.g. example 38) relates to a previously-described example (e.g. one or more of examples 31-37), wherein the second RFIC means in the chassis means is configured to perform upconversion to generate the data signals that are transmitted to the first RFIC means in the display means via propagation though the first circular waveguide, the second circular waveguide, and the coupling section in accordance with a TM01 excitation mode, and wherein the first RFIC means is configured to downconvert the data signals.

Another example (e.g. example 39) relates to a previously-described example (e.g. one or more of examples 31-38), wherein the first rotatable means is formed via a mated coupling between the first circular waveguide and the coupling section, and wherein the mated coupling comprises a non-conductive sleeve that is coupled between the first circular waveguide and the coupling section while maintaining a galvanic coupling between the first circular waveguide and the coupling section.

Another example (e.g. example 40) relates to a previously-described example (e.g. one or more of examples 31-39), wherein the first rotatable means is formed via a mated coupling between the first circular waveguide and the coupling section, and wherein the mated coupling comprises a non-conductive sleeve that is formed over a portion of the first circular waveguide or a portion of the coupling section while maintaining a galvanic coupling between the first circular waveguide and the coupling section.

An apparatus as shown and described.

A method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

What is claimed is:

1. A rotatable circular waveguide structure, comprising:
   a first circular waveguide coupled to a display portion of an electronic device and having a first outer diameter;
   a second circular waveguide coupled to a chassis portion of the electronic device and having the first outer diameter,
   wherein the first circular waveguide and the second circular waveguide are coupled to one another via a coupling section that is routed through a hinge of the electronic device; and
   a sleeve coupled between (i) a first transition portion formed in the first circular waveguide having a first conductive surface formed between a second outer diameter, which is less than the first outer diameter, and an inner diameter of the first circular waveguide, and (ii) a second transition portion formed in the coupling section, the second transition portion including a second conductive surface,
   wherein the first transition portion is configured to fit within the second transition portion to provide a first rotatable junction,
   wherein the sleeve facilitates, during rotation of a section of the first circular waveguide and the coupling section with respect to one another, galvanic coupling to be maintained by way of physical contact being maintained between the first conductive surface of the first transition portion and the second conductive surface of the second transition portion abutting one another, and
   wherein the first circular waveguide, the second circular waveguide, and the coupling section are configured to enable a propagation of data signals between the chassis portion and the display portion of the electronic device.

2. The rotatable circular waveguide structure of claim 1, wherein the coupling section is coupled to the first circular waveguide at the first rotatable junction that enables a rotation of a section of the first circular waveguide and the coupling section with respect to one another as the chassis portion and the display portion are rotated with respect to one another.

3. The rotatable circular waveguide structure of claim 1, wherein the coupling section is coupled to the second circular waveguide at a second rotatable junction, and
   wherein the second rotatable junction is configured to enable a rotation of a section of the second circular waveguide and the coupling section with respect to one another as the chassis portion and the display portion are rotated with respect to one another.

4. The rotatable circular waveguide structure of claim 1, wherein the first circular waveguide is coupled to a first radio frequency integrated circuit (RFIC) in the display portion of the electronic device via a first waveguide to RFIC transition, and
   wherein the second circular waveguide is coupled to a second RFIC in the chassis portion of the electronic device via a second waveguide to RFIC transition.

5. The rotatable circular waveguide structure of claim 4, wherein the first waveguide to RFIC transition and the second waveguide to RFIC transition comprise an edge-coupled waveguide to RFIC transition.

6. The rotatable circular waveguide structure of claim 5, wherein the edge-coupled waveguide to RFIC transition of the first waveguide to RFIC transition and the edge-coupled waveguide to RFIC transition of the second waveguide to RFIC transition comprise a ground arc configured to be galvanically coupled to the first circular waveguide and the second circular waveguide, respectively, and wherein the ground arc is formed by a plurality of vias interconnecting metal layers in a substrate package.

7. The rotatable circular waveguide structure of claim 4, wherein the first waveguide to RFIC transition and the second waveguide to RFIC transition each comprises a respective signal exciter configured to perform excitation of a TM01 mode in the first circular waveguide and the second circular waveguide, respectively.

8. The rotatable circular waveguide structure of claim 4, wherein the second RFIC in the chassis portion is configured to perform upconversion to generate the data signals that are transmitted to the first RFIC in the display portion via propagation though the first circular waveguide, the second circular waveguide, and the coupling section in accordance with a TM01 excitation mode, and wherein the first RFIC is configured to downconvert the data signals.

9. The rotatable circular waveguide structure of claim 1, wherein the sleeve comprises a non-conductive sleeve that is coupled between the first circular waveguide and the coupling section, the non-conductive sleeve being disposed between the first outer diameter and the second outer diameter of the first circular waveguide.

10. The rotatable circular waveguide structure of claim 1, wherein the sleeve comprises a non-conductive sleeve that is configured to be formed over a portion of the first transition portion first or a portion of the second transition portion.

11. The rotatable circular waveguide structure of claim 1, wherein the sleeve facilitates the galvanic coupling being maintained during rotation of the section of the first circular waveguide and the coupling section with respect to one another about a common central axis of the first circular waveguide and the coupling section.

12. The rotatable circular waveguide structure of claim 1, wherein:

the first circular waveguide is coupled to a first electro-magnetic (EM) coupler of a first radio frequency integrated circuit (RFIC) that is disposed in the display portion of the electronic device, the second circular waveguide is coupled to a second EM coupler of a second RFIC that is disposed in the chassis portion of the electronic device, the first and the second EM coupler are disposed proximate to the first and the second RFIC, respectively, and the first and the second RFIC are disposed remote to the coupling section, and the propagation of data signals between the first RFIC and the second RFIC comprises a wire-free data signal propagation.

13. An electronic device, comprising:

a chassis portion;

a display portion, the chassis portion and the display portion being configured to be rotatable with respect to one another, a first circular waveguide coupled to the chassis portion and having a first outer diameter;

a second circular waveguide coupled to the display portion and having the first outer diameter;

a coupling section that is routed through a hinge of the electronic device; and a sleeve coupled between (i) a first transition portion formed in the first circular waveguide having a first conductive surface formed between a second outer diameter, which is less than the first outer diameter, and an inner diameter of the first circular waveguide, and (ii) a second transition portion formed in the coupling section, the second transition portion including a second conductive surface, wherein the first transition portion is configured to fit within the second transition portion to provide a first rotatable junction, wherein the sleeve facilitates, during rotation of a section of the first circular waveguide and the coupling section with respect to one another, galvanic coupling to be maintained by way of physical contact being maintained between the first conductive surface of the first transition portion and the second conductive surface of the second transition portion abutting one another, and wherein the first circular waveguide, the second circular waveguide, and the coupling section are configured to enable a propagation of data signals between the chassis portion and the display portion of the electronic device.

14. The electronic device of claim 13, wherein the first circular waveguide and the second circular waveguide are coupled to one another via the coupling section, the coupling section being coupled to the first circular waveguide at the first rotatable junction that enables a rotation of a section of the first circular waveguide and the coupling section with respect to one another as the chassis portion and the display portion are rotated with respect to one another.

15. The electronic device of claim 13, wherein the coupling section is coupled to the second circular waveguide at a second rotatable junction, and wherein the second rotatable junction is configured to enable a rotation of a section of the second circular waveguide and the coupling section with respect to one another as the chassis portion and the display portion are rotated with respect to one another.

16. The electronic device of claim 13, further comprising:

a first radio frequency integrated circuit (RFIC) in the display portion coupled to the first circular waveguide via a first waveguide to RFIC transition, and a second RFIC in the chassis portion coupled to the second circular waveguide via a second waveguide to RFIC transition.

17. The electronic device of claim 16, wherein the first waveguide to RFIC transition and the second waveguide to RFIC transition comprise an edge-coupled waveguide to RFIC transition.

18. The electronic device of claim 17, wherein the edge-coupled waveguide to RFIC transition of the first waveguide to RFIC transition and the edge-coupled waveguide to RFIC transition of the second waveguide to RFIC transition comprise a ground arc configured to be galvanically coupled to the first circular waveguide and the second circular waveguide, respectively, and wherein the ground arc is formed by a plurality of vias interconnecting metal layers in a substrate package.

19. The electronic device of claim 16, wherein the first waveguide to RFIC transition and the second waveguide to RFIC transition each comprises a respective signal exciter configured to perform excitation of a TM01 mode in the first circular waveguide and the second circular waveguide, respectively.

20. The electronic device of claim 16, wherein the second RFIC in the chassis portion is configured to perform upconversion to generate the data signals that are transmitted to the first RFIC in the display portion via propagation though the first circular waveguide, the second circular waveguide, and the coupling section in accordance with a TM01 excitation mode, and wherein the first RFIC is configured to downconvert the data signals.

21. The electronic device of claim 13, wherein the sleeve comprises a non-conductive sleeve that is coupled between the first circular waveguide and the coupling section, the non-conductive sleeve being disposed between the first outer diameter and the second outer diameter of the first circular waveguide.

22. The electronic device of claim 13, wherein the sleeve comprises a non-conductive sleeve that is configured to be formed over a portion of the first transition portion or a portion of the second transition portion.

\* \* \* \* \*